US012293645B2

(12) United States Patent
Cornell et al.

(10) Patent No.: US 12,293,645 B2
(45) Date of Patent: May 6, 2025

(54) SYSTEMS AND METHODS FOR CARGO MANAGEMENT, VERIFICATION, AND TRACKING

(71) Applicant: The Travelers Indemnity Company, Hartford, CT (US)

(72) Inventors: Scott Cornell, Peoria, AZ (US);
Ernesto Jaramillo, Avon, CT (US);
Oleg M. Kirshon, West Hartford, CT (US); Prabir Das, Ellington, CT (US);
Yamiel L Zea, Hartford, CT (US);
Lauren C. Berry, Canton, CT (US)

(73) Assignee: The Travelers Indemnity Company, Hartford, CT (US)

( * ) Notice: Subject to any disclaimer, the term of this patent is extended or adjusted under 35 U.S.C. 154(b) by 0 days.

(21) Appl. No.: 18/316,204

(22) Filed: May 11, 2023

(65) Prior Publication Data

US 2023/0282083 A1    Sep. 7, 2023

Related U.S. Application Data

(63) Continuation of application No. 17/707,056, filed on Mar. 29, 2022, now Pat. No. 11,663,890, which is a continuation of application No. 16/951,810, filed on Nov. 18, 2020, now Pat. No. 11,302,160, which is a continuation of application No. 16/655,529, filed on Oct. 17, 2019, now Pat. No. 10,854,055.

(51) Int. Cl.
*G08B 13/194* (2006.01)
*G06Q 10/0833* (2023.01)
*G06V 20/52* (2022.01)
*G08B 3/10* (2006.01)

(52) U.S. Cl.
CPC ........... *G08B 13/194* (2013.01); *G06V 20/52* (2022.01); *G08B 3/1016* (2013.01); *G06Q 10/0833* (2013.01)

(58) Field of Classification Search
None
See application file for complete search history.

(56) References Cited

U.S. PATENT DOCUMENTS

| 7,253,731 | B2 | 8/2007 | Joao |
| 7,482,920 | B2 | 1/2009 | Joao |
| 7,610,210 | B2 | 10/2009 | Helitzer et al. |
| 7,711,584 | B2 | 5/2010 | Helitzer et al. |
| 7,945,105 | B1 | 5/2011 | Jaenisch |
| 8,271,303 | B2 | 9/2012 | Helitzer et al. |
| 8,515,788 | B2 | 8/2013 | Tracy et al. |
| 8,731,978 | B2 | 5/2014 | Tracy et al. |

(Continued)

FOREIGN PATENT DOCUMENTS

WO    WO2017178712    10/2017

OTHER PUBLICATIONS

O'Connell, John, "Marine Cargo Security", Risk Management 51.3 (Mar. 2004), pp. 1-5; 5 p.

(Continued)

*Primary Examiner* — Stefan Gadomski
(74) *Attorney, Agent, or Firm* — RowanTree Law Group, PLLC; Carson C. K. Fincham

(57) ABSTRACT

Systems, apparatus, methods, and articles of manufacture for management, verification, and tracking of cargo, such as by providing digital cargo handler identification authentication.

16 Claims, 14 Drawing Sheets

(56) References Cited

U.S. PATENT DOCUMENTS

| | | | |
|---|---|---|---|
| 9,747,901 B1* | 8/2017 | Gentry | B64C 39/024 |
| 9,847,029 B2 | 12/2017 | Joao | |
| 10,134,205 B2 | 11/2018 | Arena | |
| 10,152,876 B2 | 12/2018 | Joao | |
| 10,181,109 B2 | 1/2019 | Joao | |
| 10,255,578 B1* | 4/2019 | Comeau | G07F 17/0092 |
| 10,262,410 B2 | 4/2019 | Chen | |
| 10,482,420 B1* | 11/2019 | Brooks | G06Q 10/0836 |
| 10,627,244 B1* | 4/2020 | Lauka | G01C 21/3623 |
| 11,222,299 B1* | 1/2022 | Baalke | G01C 21/3688 |
| 11,466,998 B1* | 10/2022 | Williams | G06Q 10/0635 |
| 11,727,343 B2* | 8/2023 | Kanaoka | G07C 9/00896 |
| | | | 705/333 |
| 2005/0038682 A1 | 2/2005 | Gandee et al. | |
| 2005/0049962 A1 | 3/2005 | Porter et al. | |
| 2005/0055248 A1 | 3/2005 | Helitzer et al. | |
| 2005/0055249 A1 | 3/2005 | Helitzer et al. | |
| 2006/0036473 A1 | 2/2006 | Taylor | |
| 2007/0222674 A1* | 9/2007 | Tan | G01S 19/49 |
| | | | 342/357.32 |
| 2008/0065427 A1 | 3/2008 | Helitzer et al. | |
| 2009/0265193 A1 | 10/2009 | Collins et al. | |
| 2010/0036783 A1 | 2/2010 | Rodriguez | |
| 2010/0106533 A1 | 4/2010 | Alvarez | |
| 2010/0153140 A1 | 6/2010 | Helitzer et al. | |
| 2010/0174566 A1 | 7/2010 | Helitzer et al. | |
| 2010/0205104 A1* | 8/2010 | Johnson | G06Q 10/08 |
| | | | 709/219 |
| 2011/0016318 A1* | 1/2011 | Syngkon | H04L 9/3247 |
| | | | 340/572.1 |
| 2011/0137685 A1 | 6/2011 | Tracy et al. | |
| 2012/0317059 A1* | 12/2012 | Joshi | G06Q 10/06 |
| | | | 706/45 |
| 2013/0078968 A1 | 3/2013 | Breed | |
| 2013/0098989 A1* | 4/2013 | Salzman | G06Q 10/08 |
| | | | 235/375 |
| 2014/0036072 A1 | 2/2014 | Lyall | |
| 2015/0343993 A1* | 12/2015 | Ferrieres | B60R 25/04 |
| | | | 701/2 |
| 2016/0019496 A1* | 1/2016 | Gorlin | C01G 49/10 |
| | | | 705/333 |
| 2016/0048796 A1* | 2/2016 | Todasco | G06Q 10/083 |
| | | | 705/330 |
| 2016/0050356 A1* | 2/2016 | Nalepka | H04N 7/181 |
| | | | 348/148 |
| 2016/0104112 A1* | 4/2016 | Gorlin | G06F 16/29 |
| | | | 705/338 |
| 2016/0104113 A1* | 4/2016 | Gorlin | G06Q 10/08355 |
| | | | 705/338 |
| 2016/0180186 A1 | 6/2016 | Sun | |
| 2016/0189087 A1 | 6/2016 | Morton | |
| 2017/0161586 A1 | 6/2017 | Xu | |
| 2017/0312789 A1 | 11/2017 | Schroader | |
| 2017/0313269 A1 | 11/2017 | Breed | |
| 2018/0052462 A1 | 2/2018 | Arena | |
| 2018/0130016 A1 | 5/2018 | Arena | |
| 2018/0157932 A1 | 6/2018 | Gu et al. | |
| 2018/0197139 A1* | 7/2018 | Hill | G06Q 10/0838 |
| 2018/0247262 A1 | 8/2018 | Arena | |
| 2018/0249130 A1 | 8/2018 | Arena | |
| 2018/0255443 A1 | 9/2018 | Arena | |
| 2018/0300675 A1 | 10/2018 | Arena | |
| 2018/0308045 A1 | 10/2018 | Arena | |
| 2018/0339865 A1 | 11/2018 | Schroader | |
| 2018/0341919 A1* | 11/2018 | Luhman | G01C 21/3407 |
| 2018/0352198 A1 | 12/2018 | Raasch | |
| 2019/0066045 A1* | 2/2019 | Cantrell | H04W 4/021 |
| 2019/0114577 A1* | 4/2019 | Kilburn | G06F 9/542 |
| 2019/0130351 A1 | 5/2019 | Arena | |
| 2019/0132714 A1 | 5/2019 | Arena | |
| 2019/0193945 A1 | 6/2019 | Schroader | |
| 2019/0202642 A1 | 7/2019 | Schroader | |
| 2019/0228375 A1* | 7/2019 | Laury | G05D 1/0088 |
| 2019/0279181 A1* | 9/2019 | Kelly | G07F 9/023 |
| 2019/0370575 A1* | 12/2019 | Nandakumar | B60W 60/00253 |
| 2020/0074402 A1 | 3/2020 | Adato | |
| 2020/0104785 A1* | 4/2020 | Ehrman | G01S 17/04 |
| 2020/0128226 A1 | 4/2020 | Krishnamurthy | |
| 2020/0394746 A1* | 12/2020 | Krishnamurthy | G06Q 10/083 |
| 2020/0395627 A1* | 12/2020 | Kilburn | H02J 7/00714 |
| 2021/0081890 A1* | 3/2021 | Atwood | G06Q 10/0838 |
| 2021/0214163 A1* | 7/2021 | Deacon | G06N 20/00 |
| 2021/0266742 A1* | 8/2021 | Yoshino | H04L 41/0806 |

OTHER PUBLICATIONS

Purtell, Dan et al. "Assessing Cargo Supply Risk", Security Management 50.11 (Nov. 2006), pp. 78, 80, 82-84, 86-87; 5 pps.

Drake, David, "Taking the Guesswork Out of Managing Cargo Supply Risk", National Underwriter Property Casualty/fisk & benefits management ed. 108.6, (Feb. 16, 2004), pp. 18-19; 2 pps.

Ojasalo, Jukka, "A Model of Risk Management in Globalizing Companies", The Business Review, Cambrige, 13.1 (Summer 2009), pp. 200-209; 2 pps.

Morton, Roger, "Keep Product from wandering off", Transportation & Distribution, 40.6 (Jun. 1999), pp. 84-88. 37 pps.

Notice of Allowance for U.S. Appl. No. 13/927,402 dated Jan. 6, 2014; 15 pps.

Office Action for U.S. Appl. No. 12/876,794 dated Aug. 15, 2012; 11 pps.

Notice of Allowance for U.S. Appl. No. 12/876,794 dated Mar. 6, 2013; 14 pps.

Website: "https://over-haul.com/"; download date Dec. 6, 2019; 8 pps.

Website: "https://www.babaco.com/"; download date Dec. 6, 2019.

Notice of Allowance for U.S. Appl. No. 16/655,529 dated Jul. 24, 2020; 10 pps.

Office Action for U.S. Appl. No. 16/951,810 dated Oct. 28, 2021; 8 pps.

Notice of Allowance for U.S. Appl. No. 16/951,810 dated Dec. 3, 2021; 8 pps.

Office Action for U.S. Appl. No. 17/707,056 dated Nov. 25, 2022; 9 pps.

Notice of Allowance for U.S. Appl. No. 17/707,056 dated Jan. 25, 2023; 8 pps.

* cited by examiner

SYSTEMS AND METHODS FOR CARGO MANAGEMENT, VERIFICATION, AND TRACKING

CROSS-REFERENCE TO RELATED APPLICATIONS

Benefit and priority under 35 U.S.C. § 120 is hereby claimed to, and this is a Continuation of, U.S. patent application Ser. No. 17/707,056 filed on Mar. 29, 2022 and titled "SYSTEMS AND METHODS FOR ARTIFICIAL INTELLIGENCE (AI) THEFT PREVENTION AND RECOVERY", issued as U.S. Pat. No. 11,663,890 on May 30, 2023, which itself claims benefit and priority to U.S. patent application Ser. No. 16/951,810 filed on Nov. 18, 2020 and titled "SYSTEMS AND METHODS FOR ARTIFICIAL INTELLIGENCE (AI) THEFT PREVENTION AND RECOVERY", issued as U.S. Pat. No. 11,302,160 on Apr. 12, 2022, which in-turn claims benefit and priority to U.S. patent application Ser. No. 16/655,529 filed on Oct. 17, 2019 and titled "SYSTEMS AND METHODS FOR ARTIFICIAL INTELLIGENCE (AI) THEFT PREVENTION AND RECOVERY", issued as U.S. Pat. No. 10,854,055 on Dec. 1, 2020, each of which is hereby incorporated by reference herein in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

BACKGROUND

Theft of cargo, payloads, and other supplies or materials causes billions of dollars of losses annually. While such theft may be of various sorts and occur in various locations, one aspect that most thefts have in common is that the chances of recovery of stolen goods drops dramatically as time passes. It is common, for example, for the chance of recovery to drop by approximately forty-five percent (45%) in the first twenty-four hours (24 hrs) from the occurrence of the theft event. Any delay in realizing or reporting a theft event may accordingly have significant negative impacts on the chances of recovery. Existing systems provide advantages in cargo and material documentation and tracking, each of which may benefit recovery efforts. Such systems do not however, provide solutions for theft prevention or identification of theft events.

BRIEF DESCRIPTION OF THE DRAWINGS

The figures depict embodiments for purposes of illustration only. One skilled in the art will readily recognize from the following description that alternative embodiments of the systems and methods illustrated herein may be employed without departing from the principles described herein, wherein.

DETAILED DESCRIPTION

I. Introduction

Existing systems for cargo and material documentation and tracking offer some advantages in assisting recovery efforts for stolen items but, fail to prevent theft occurrences or to enhance theft (and/or damage or other loss) event detection. Documentation applications allow for better cargo management practices that may facilitate record keeping, which may aid in recovery efforts by more readily identifying recovered items. Tracking is a well-known (but often expensive) means of locating lost property in response to a theft event. Neither of these options, however, facilitates theft prevention or identification.

In accordance with embodiments herein, these and other deficiencies of existing systems are remedied by providing systems, apparatus, methods, and articles of manufacture for Artificial Intelligence (AI) theft prevention and recovery utilizing image object analysis to identify theft (and/or damage or other loss) events and provide AI-based theft/loss prevention guidance. In some embodiments, for example, images (or other sensor data) of cargo, payloads, materials, contents, and/or other objects may be captured at different points in time and automatically compared and analyzed by stored AI logic and/or routines to identify theft, damage, and/or other loss events. According to some embodiments, AI logic may be utilized to analyze theft and/or loss event data to provide predictive guidance for current and/or future cargo, payload, material, contents, and/or other object transportation and/or storage.

II. AI Theft Prevention and Recovery Systems

Figure 1:
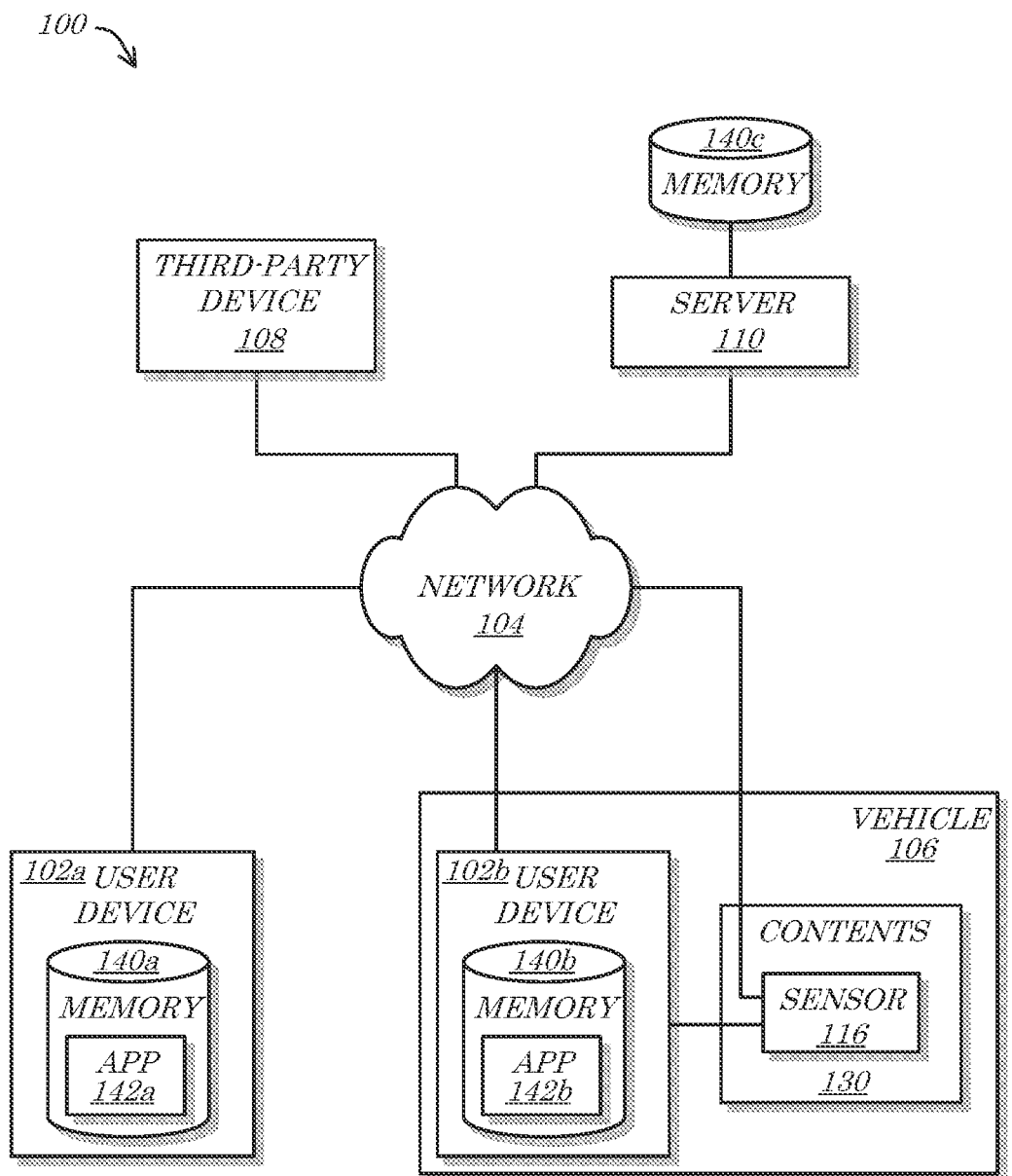
FIG. 1 is a block diagram of a system according to some embodiments.

Referring first to FIG. 1, a block diagram of a system 100 according to some embodiments is shown. In some embodiments, the system 100 may comprise a plurality of user devices 102a-b in communication via or with a network 104. According to some embodiments, one or more of the user devices 102a-b (such as a second user device 102b, as depicted) may be disposed in, in communication with, and/or otherwise associated with a vehicle 106 (or other area, location, building, object, etc.). In some embodiments, the system 100 may comprise and/or the user devices 102a-b may be in communication with a third-party device 108 and/or a server 110. In some embodiments, the vehicle 106 may comprise a sensor 116 (e.g., oriented and/or disposed to capture images, video, audio, and/or other readings descriptive of contents 130 of the vehicle 106). According to some embodiments, the sensor 116 may be coupled to and/or comprise a portion of the contents 130.

In some embodiments, any or all of the devices 102a-b, 106, 108, 110, 116 may comprise and/or be in communication with a data storage and/or memory device 140a-c. A first user device 102a may comprise a mobile electronic device, such as a laptop or tablet computer housing a first local or first memory device 140a, for example, and/or the second user device 102b may comprise a mobile electronic device, such as a smartphone housing a second local or second memory device 140b. According to some embodiments, the server 110 may comprise (and/or be in communication with) a third memory device 140c. As depicted in FIG. 1, any or all of the devices 102a-b, 106, 108, 110, 116, 140a-c (or any combinations thereof) may be in communication via the network 104. In some embodiments, communications between and/or within the devices 102a-b, 106, 108, 110, 116, 140a-c of the system 100 may be utilized to capture and analyze images and/or other readings or input from the sensor 116 with respect to (and/or descriptive of) the contents 130 of the vehicle 106. Either user device 102a-b may output an indication of a theft or loss event and/or theft or loss prevention guidance, based on input received from the sensor 116, for example, by execution of an application (or "app") 142a-b stored in the first memory device 140a or the second memory device 140b, respectively. According to some embodiments, such indication may be calculated, looked up, derived, defined, computed, and/or otherwise determined by analysis of imagery or other data captured by the sensor 116 (and/or by the user devices 102a-b and/or the vehicle 106) pursuant to an execution of AI code defined by the server 110 and/or by the app 142a-b stored in the respective memory device 140a-b of the user devices 102a-b.

Fewer or more components 102a-b, 106, 108, 110, 116, 140a-c, 142a-b and/or various configurations of the depicted components 102a-b, 106, 108, 110, 116, 140a-c, 142a-b may be included in the system 100 without deviating from the scope of embodiments described herein. In some embodiments, the components 102a-b, 106, 108, 110, 116, 140a-c, 142a-b may be similar in configuration and/or functionality to similarly named and/or numbered components as described herein. In some embodiments, the system 100 (and/or portion thereof) may comprise an AI-based theft prevention and recovery system and/or platform programmed and/or otherwise configured to execute, conduct, and/or facilitate the method 400 of FIG. 4 herein, and/or portions thereof.

The user devices 102a-b, in some embodiments, may comprise any type or configuration of computing, mobile electronic, network, user, and/or communication devices that are or become known or practicable. The user devices 102a-b may, for example, comprise one or more Personal Computer (PC) devices, computer workstations, tablet computers, such as an iPad® manufactured by Apple®, Inc. of Cupertino, CA, and/or cellular and/or wireless telephones, such as an iPhone® (also manufactured by Apple®, Inc.) or an LG V50 THINQ™ 5G smart phone manufactured by LG® Electronics, Inc. of San Diego, CA, and running the Android® operating system from Google®, Inc. of Mountain View, CA. In some embodiments, the user devices 102a-b may comprise one or more devices owned and/or operated by one or more users (not shown), such as a driver of the vehicle 106 (e.g., human and/or AI) and/or an electronic product (e.g., underwriting product) customer (or potential customer). The first user device 102a may be operated by a cargo/payload loading entity that loads the contents 130 in/on the vehicle 106, for example, and/or the second user device 102b may be operated by a driver of the vehicle 106. According to some embodiments, the user devices 102a-b may communicate with the server 110 either directly or via the network 104 to (i) provide input from the sensor 116, (ii) provide information descriptive of the contents 130 and/or the vehicle 106, (iii) to retrieve/receive AI analysis results, (iv) to retrieve/receive theft/loss alerts and/or notifications, (v) to retrieve/receive theft/loss prevention suggestions/guidance, and/or (vi) to trigger and/or authorize one or more third-party alerts by automatically contacting a police authority and/or insurance carrier, in accordance with AI theft prevention and recovery processes as described herein.

The network 104 may, according to some embodiments, comprise a Local Area Network (LAN; wireless and/or wired), cellular telephone, Bluetooth®, Near Field Communication (NFC), and/or Radio Frequency (RF) network with communication links between the server 110, the user devices 102a-b, the third-party device 108, and/or the memory devices 140a-c. In some embodiments, the network 104 may comprise direct communication links between any or all of the components 102a-b, 106, 108, 110, 116, 140a-c of the system 100. The user devices 102a-b may, for example, be directly interfaced or connected to one or more of the server 110 and/or the third-party device 108 via one or more wires, cables, wireless links, and/or other network components, such network components (e.g., communication links) comprising portions of the network 104. In some embodiments, the network 104 may comprise one or many other links or network components other than those depicted in FIG. 1. The server 110 may, for example, be connected to the vehicle 106 via various cell towers, routers, repeaters, ports, switches, and/or other network components that comprise the Internet and/or a cellular telephone (and/or Public Switched Telephone Network (PSTN)) network, and which comprise portions of the network 104.

While the network 104 is depicted in FIG. 1 as a single object, the network 104 may comprise any number, type, and/or configuration of networks that is or becomes known or practicable. According to some embodiments, the network 104 may comprise a conglomeration of different sub-networks and/or network components interconnected, directly or indirectly, by the components 102a-b, 106, 108, 110, 116, 140a-c of the system 100. The network 104 may comprise one or more cellular telephone networks with communication links between the second user device 102b and the server 110, for example, and/or may comprise an NFC or other short-range wireless communication path, with communication links between the sensor 116, the first user device 102a, and/or one or more of the memory devices 140a-c, for example.

According to some embodiments, the vehicle 106 may comprise any type, quantity, and/or configuration of transportation or other object or area that is or becomes known or practicable. The vehicle 106 may comprise a passenger vehicle or fleet vehicle (e.g., a car, truck, train, boat, ship, and/or airplane), for example, that is utilized to transport or move the contents 130 from a first location (e.g., an origin) to a second location (e.g., a destination). In some embodiments, the vehicle 106 may comprise a flatbed, lowboy, box, refrigerator (or "reefer"), container, tanker, dump, dry bulk, and/or car hauler semi-trailer, and/or associated tractor unit, and the contents 130 may comprise a payload or cargo thereof. According to some embodiments, the vehicle 106 may instead comprise a location, such as a jobsite, construction site, and/or storage unit or site, and the contents 130 may comprise materials and/or supplies, such as, but not limited to, construction materials and/or equipment, tools, and/or building supplies and/or materials.

The third-party device 108, in some embodiments, may comprise any type or configuration of a computerized processing device, such as a PC, laptop computer, computer server, database system, and/or other electronic device, devices, or any combination thereof. In some embodiments, the third-party device 108 may be owned and/or operated by a third-party (i.e., an entity different than any entity owning and/or operating either the user devices 102a-b or the server 110; such as a certificate, authentication, or cryptographic service provider, a police or other law enforcement agency system, and/or an underwriting product company). The third-party device 108 may, for example, execute one or more web services that provide for centralized firmware and/or logic updating functionality, online AI object and/or image analysis, online AI theft/loss prevention analysis, and/or online navigational routing functionality. In some embodiments, the third-party device 108 may provide and/or transmit data (e.g., AI analysis results and/or law enforcement data) to the second user device 102b and/or the server 110. According to some embodiments, the third-party device 108 may comprise a plurality of devices and/or may be associated with a plurality of third-party entities (not shown).

In some embodiments, the server 110 may comprise an electronic and/or computerized controller device, such as a computer server communicatively coupled to interface with the user devices 102a-b and/or the third-party device 108a (directly and/or indirectly). The server 110 may, for example, comprise one or more PowerEdge™ R830 rack servers manufactured by Dell®, Inc. of Round Rock, TX which may include one or more Twelve-Core Intel® Xeon® E5-4640 v4 electronic processing devices. In some embodiments, the server 110 may comprise a plurality of processing devices specially programmed to execute and/or conduct processes that are not practicable without the aid of the server 110. The server 110 may, for example, execute one or more coded rules to manage wireless communications of the user devices 102a-b (e.g., a cellphone service provider) and/or the third-party device 108, and/or may provide complex AI-based image/object analysis services, either of which may not be capable of being conducted without the benefit of the specially-programmed server 110. According to some embodiments, the server 110 may be located remotely from one or more of the user devices 102a-b, the vehicle 106, and/or the third-party device 108. The server 110 may also or alternatively comprise a plurality of electronic processing devices located at one or more various sites and/or locations.

According to some embodiments, the server 110 may store and/or execute specially programmed instructions (e.g., stored in the third memory device 140c, but not separately depicted in FIG. 1) to operate in accordance with embodiments described herein. The server 110 may, for example, execute one or more programs, modules, and/or routines (e.g., the app 142a-b) that facilitate the analysis, monitoring, and/or safeguarding of the contents 130 of the vehicle 106, as described herein. According to some embodiments, the server 110 may comprise a computerized processing device, such as a centralized server utilized, for example, to (i) identify correlations between portions of received images and/or sensor readings descriptive of the contents 130 and items that comprise the contents 130, (ii) identify differences between images/sensor readings descriptive of the contents 130 over time, (iii) classify the differences, (iv) trigger an alert and/or notification based on the classification, (v) classify a theft/loss risk based on information descriptive of the contents 130, and/or (vi) trigger and/or provide theft/loss prevention guidance based on the classification of the contents 130, as described herein.

The sensor 116, in some embodiments, may comprise any type, quantity, and/or configuration of data gathering and/or input device that is or becomes known or practicable.

According to some embodiments, the sensor 116 may comprise one or more sensors configured and/or coupled to sense, measure, calculate, and/or otherwise process or determine data descriptive of the contents 130, the vehicle 106, and/or an environment (not separately depicted) in which they are disposed, such as light measurements, strain measurements, temperature readings, moisture and/or humidity readings, sound readings, vibration readings, weight readings, Infrared Radiation (IR) and/or microwave readings (e.g., motion sensor readings and/or IR intensity readings), and/or location readings. In some embodiments, the sensor 116 may be disposed and/or positioned to acquire data descriptive of the contents 130, the vehicle 106, and/or the environment(s) thereof, but may be part of a separate device and/or object, such as the vehicle 106 and/or the user devices 102a-b. The sensor 116 may comprise, for example, a camera and/or other sensor of one or more of the user devices 102a-b. In some embodiments, sensor data may be provided to the apps 142a-b and/or the server 110 to identify changes in the contents 130, e.g., to predict, prevent, and/or identify theft and/or loss events thereof.

In some embodiments, the user devices 102a-b, the third-party device 108, the sensor 116, and/or the server 110 may be in communication with and/or comprise the memory devices 140a-c. The memory devices 140a-c may comprise, for example, various databases and/or data storage mediums that may store, for example, image (and/or other sensor) data, object identification rules, object data, cargo/material rule and/or scenario data, location data, theft/loss prevention rules and/or data, cryptographic keys and/or data, login and/or identity credentials, and/or instructions (e.g., AI-based theft/loss prevention and/or recovery instructions and/or guidance) that cause various devices (e.g., the third-party device 108 and/or the user devices 102a-b) to operate in accordance with embodiments described herein.

The memory devices 140a-c may store, for example, the apps 142a-b, each of which may, when executed, participate in and/or cause AI-based theft/loss prevention and/or recovery, as described herein. In some embodiments, the memory devices 140a-c may comprise any type, configuration, and/or quantity of data storage devices that are or become known or practicable. The memory devices 140a-c may, for example, comprise an array of optical and/or solid-state hard drives configured to store digital image and/or video data, image and/or object analysis data and/or cargo/material analysis data (e.g., analysis formulas and/or mathematical models), credentialing instructions and/or keys, and/or various operating instructions, drivers, etc. While the memory devices 140a-c are depicted as stand-alone components of the user devices 102a-b and the server 110, the memory devices 140a-c may comprise multiple components. In some embodiments, a multi-component memory device 140a-c may be distributed across various devices and/or may comprise remotely dispersed components. Any or all of the user devices 102a-b, the vehicle 106, the contents 130, the third-party device 108, and/or the server 110 may comprise the memory devices 140a-c or a portion thereof, for example.

Figure 2A:
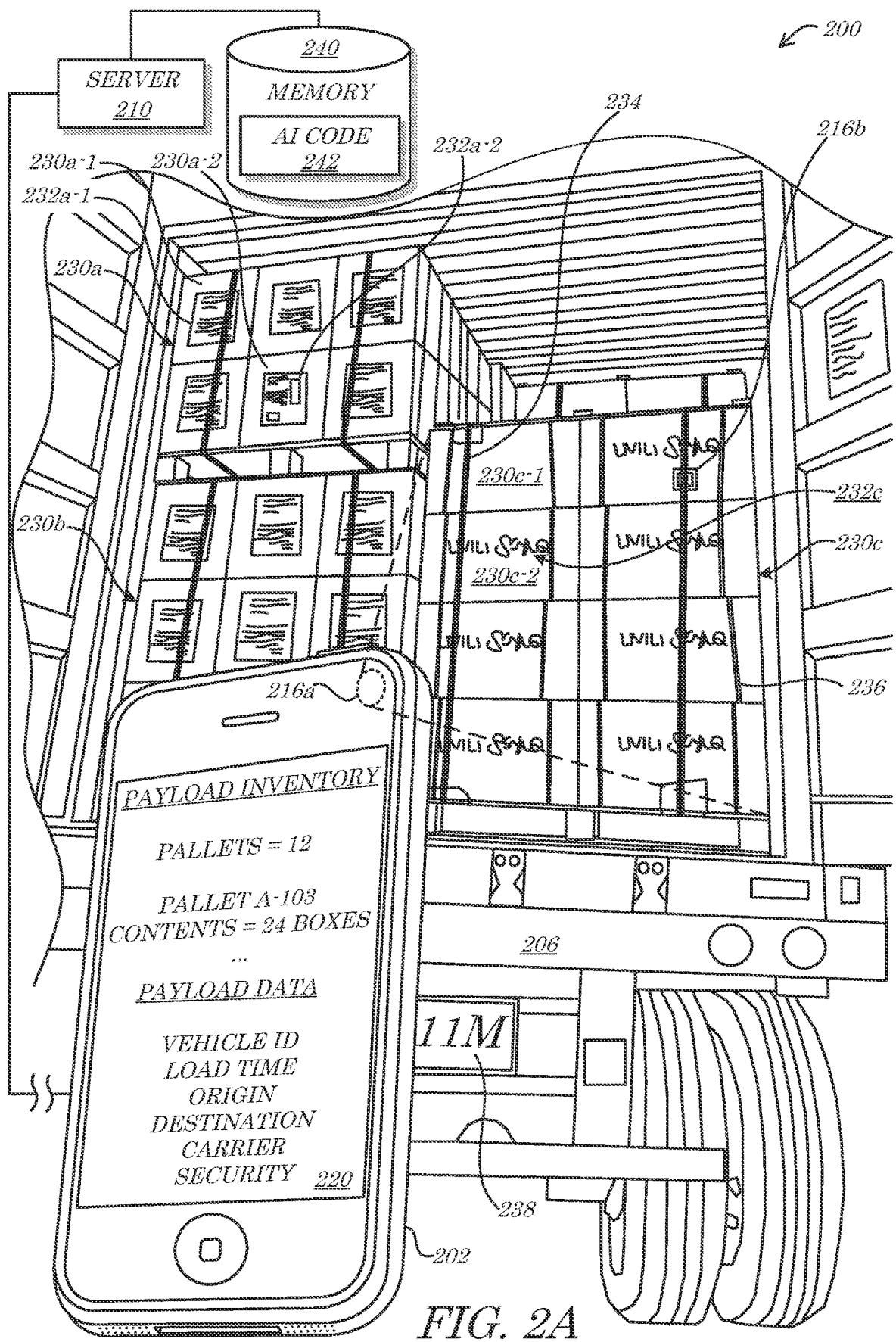
FIG. 2A and FIG. 2B are perspective diagrams of a system at different points in time, according to some embodiments.
Figure 2B:
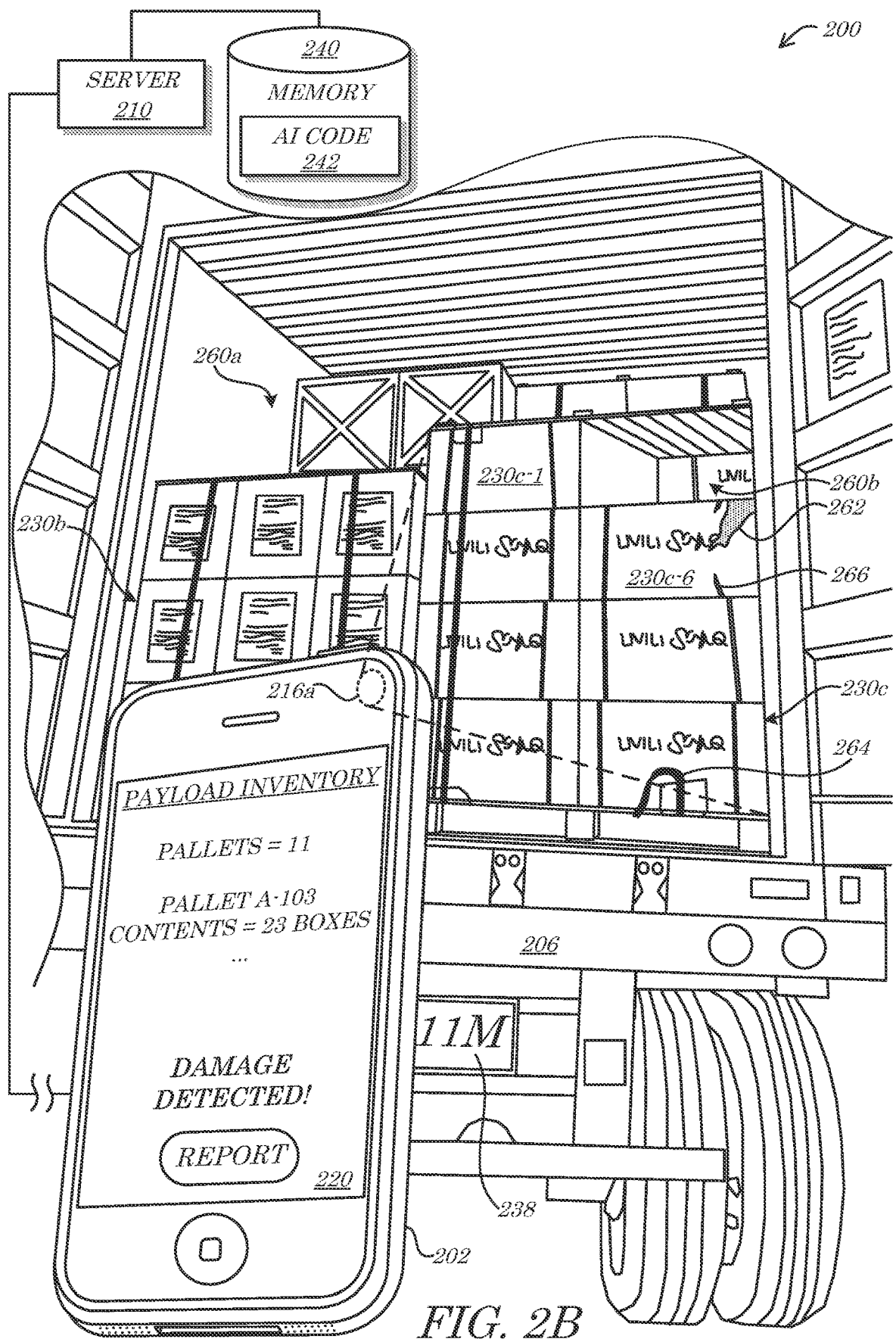

Referring now to FIG. 2A and FIG. 2B, perspective diagrams of a system 200 at different points in time according to some embodiments are shown. The system 200 may comprise, for example, a user device 202 and a vehicle 206, with the user device 202 being in communication with a remotely positioned server 210. According to some embodiments, the user device 202 may be disposed near or in (e.g., coupled to) the vehicle 206 and/or may comprise a camera 216a (and/or other sensor) and/or the vehicle 206 may comprise a sensor 216b. According to some embodiments, the user device 202 may comprise and/or output an interface 220 that, e.g., displays information related to data captured by the camera 216a and/or the sensor 216b. In some embodiments (such as depicted), the user device 202 (and/or the camera 216a thereof) and/or the sensor 216b may be disposed and/or oriented to capture data descriptive of cargo 230a-c being transported by (or loaded or stored within) the vehicle 206. As depicted for non-limiting purposes of example in FIG. 2A and FIG. 2B, the cargo 230a-c may comprise a first cargo pallet 230a, a second cargo pallet 230b, and/or a third cargo pallet 230c loaded within the vehicle 206. The cargo pallets 230a-c may comprise any number, type, and/or configuration of materials, payload, cargo, contents, supplies, tools, and/or other objects that are or become known or practicable. In some embodiments, the cargo pallets 230a-c may comprise individual items, such as boxes, crates, and/or other objects. As depicted in FIG. 2A, for example, the first cargo pallet 230a may comprise a first box 230a-1 and a second box 230a-2 and/or the third cargo pallet 230c may comprise a first crate 230c-1 and a second crate 230c-2.

According to some embodiments, the user device 202 and/or the server 210 may process data from the camera 216a and/or from the sensor 216b and execute specially programmed code (software and/or firmware code) to identify the boxes 230a-1, 230a-2, the crates 230c-1, 230c-2, and/or other objects, characteristics, and/or items descriptive of the cargo 230a-c, such as labels 232a-1, 232a-2, 232c, pallet straps or seals 234, box or crate straps or seals 236, and/or vehicle indicia 238 (e.g., a license plate, VIN, trailer number, freight carrier logo, etc.). The server 210 may utilize the detection of the objects 230a-1, 230a-2, 230c-1, 230c-2, 230a-c, 232a-1, 232a-2, 232c, 234, 236, 238 in various manners to derive information and/or compute classifications and/or conclusions regarding the cargo 230a-c and/or the vehicle 206. In some embodiments, for example, the server 210 and/or the user device 202 may identify a first box label 232a-1 of the first box 230a-1 (e.g., based on input received from the camera 216a and/or the sensor 216b) and execute an Optical Character Recognition (OCR) algorithm to identify alphanumeric data depicted on the first box label 232a-1. In the example case depicted in FIG. 2A and FIG. 2B, the server 210 and/or the user device 202 may identify that the vehicle indicia 238 comprises a license plate and that a partial plate number reads "11M". According to some embodiments, any data descriptive of any of the objects 230a-1, 230a-2, 230c-1, 230c-2, 230a-c, 232a-1, 232a-2, 232c, 234, 236, 238, such as recognized indicia thereof, location, size, shape, quantity, color, etc., may be stored in a database or memory device 240. The server 210 (and/or the user device 202) may comprise or be in communication with the memory device 240, for example, and may store data descriptive of the cargo 230a-c and/or the vehicle 206 therein. In some embodiments, the memory device 240 may store AI code 242 that is specially programmed to (i) predict risks to the cargo 230a-c based on the data descriptive of the objects 230a-1, 230a-2, 230c-1, 230c-2, 230a-c, 232a-1, 232a-2, 232c, 234, 236, 238 and/or (ii) identify indications of theft or loss based on the data descriptive of the objects 230a-1, 230a-2, 230c-1, 230c-2, 230a-c, 232a-1, 232a-2, 232c, 234, 236, 238.

The AI code 242 may be utilized (e.g., executed) by the server 210 and/or the use device 202, for example, to identify a type of cargo 230a-c (e.g., from labels 232a-1, 232a-2, 232c) and identify or calculate, for the specific type of cargo 230a-c one or more risks. In the case that the cargo 230a-c comprises home theatre electronic components, for example, historic loss data stored in the memory device 240 may be queried and/or analyzed to determine that such cargo 230a-c frequently suffers damage from high humidity levels. According to some embodiments, the interface 220 may be utilized to output guidance to a user/driver (not shown) that is descriptive of the sensitivity to humidity levels. Similarly, the sensor 216b may be utilized to detect or measure humidity levels that are then compared, by the AI code 242 to a stored threshold to determine whether the current conditions of the cargo 230a-c are within acceptable levels (e.g., to minimize the chances of damage). In some embodiments, the type of cargo 230a-c may be correlated to historic theft occurrences to identify characteristics that have been realized with some frequency in previous theft scenarios. The AI code 242 may determine, for example, that home theatre equipment types of cargo 230a-c are most frequently stolen after dark and/or when it is not raining. In such embodiments, the interface 220 may be utilized to alert or notify the user/driver regarding impending or current weather and/or time-of-day conditions that increase theft risk to the cargo 230a-c. In some embodiments, potential discrepancies in the cargo 230a-c may be identified by object recognition executed by the AI code 242. The AI code 242 may, for example, identify that the first box label 232a-1 does not match a second box label 232a-2 and/or that a logo or label 232c of the second crate 230c-2 does not appear on the first crate 230c-1. Either of these identifications may be evidence of improper loading or packing, mixed-goods cargo 230a-c, and/or other characteristics of the cargo 230a-c.

In some embodiments, the server 210 and/or the user device 202 may execute the AI code 242 that analyzes the cargo 230a-c over time to derive data descriptive of possible theft, damage, and/or other loss events in relation to the cargo 230a-c and/or the vehicle 206. As depicted in FIG. 2A, for example, the camera 216a of the user device 202 may capture an image (or other data) descriptive of the cargo 230a-c (or a portion thereof, such as the third cargo pallet 230c) at a first point in time and may identify various attributes and/or characteristics of the first instance of the cargo 230a-c, such as a dimension/height, shape, location (absolute and/or relative to other objects), etc. According to some embodiments, the user device 202 may transmit the image to the server 210 and the server may execute the AI code 242 to identify objects in the image, such as the first cargo pallet 230a, the third cargo pallet 230c, and/or the pallet straps 234 of the third cargo pallet 230c. In some embodiments, such as in the case that the first cargo pallet 230a, the third cargo pallet 230c, and/or the pallet straps 234 of the third cargo pallet 230c are found to be present in multiple images and/or video frames captured by the camera 216a, the server 210 may identify a second instance or view of the cargo 230a-c at a second time, as depicted in FIG. 2B. According to some embodiments, execution of the AI code 242 may cause a comparison of any initial or first attributes of the first instance of the cargo 230a-c to an identified second attribute of the second instance of the cargo 230a-c to derive, compute, and/or calculate a characteristic of the cargo 230a-c. In the example depicted in FIG. 2A and FIG. 2B, for example, the AI code 242 may determine (e.g., via an object-based analysis of data descriptive of the cargo 230a-c captured at different times) one or more instances of missing objects 260a-b, damaged objects 262, damaged pallet straps 264, and/or damaged crate seals 266.

According to some embodiments, the comparison of the attributes may be utilized to lookup, calculate, and/or otherwise compute quantitative metrics regarding the cargo 230a-c. Based on the magnitude of the differences in dimensions/measurements, textures, heat signatures, colors, and/or locations, for example, the AI code 242 may (i) identify an instance of a missing pallet 260a, (ii) identity an instance of a missing crate 260b, (iii) identify an instance of a damaged crate 262, (iv) identify an instance of a compromised pallet strap 264, and/or (v) identify an instance of a compromised crate seal 266. In some embodiments, the presence or absence of the sensor 216b may also or alternatively be taken into account when analyzing a status or classification of the cargo 230a-c. In the case that the identified missing crate 260b was a crate to which the sensor 216b was coupled, for example, the instance of the missing crate 260b may be identified by object detection and analysis and/or by analyzing signals from the sensor 216b. In the case that no signal from the sensor 216b can be detected, for example, it may be presumed that the sensor 216b and associated crate are missing from the third cargo pallet 230c. In some embodiments, such as in the case that the sensor 216b comprises a location tracking device, such as an RFID and/or GPS device, data received from the sensor 216b may indicate that the sensor 216b and associated crate are not located proximate to the vehicle 206, e.g., an indication of theft. According to some embodiments, the interface 220 may output an indication of the missing and/or damaged objects 260a-b, 262, 264, 266 and/or may provide a mechanism for the user to initiate an automatic reporting of the missing and/or damaged objects 260a-b, 262, 264, 266 (e.g., to a law enforcement agency, underwriting agency, shipping company, etc.).

III. AI Theft Prevention and Recovery Augmented Reality Interface Systems

Figure 3:
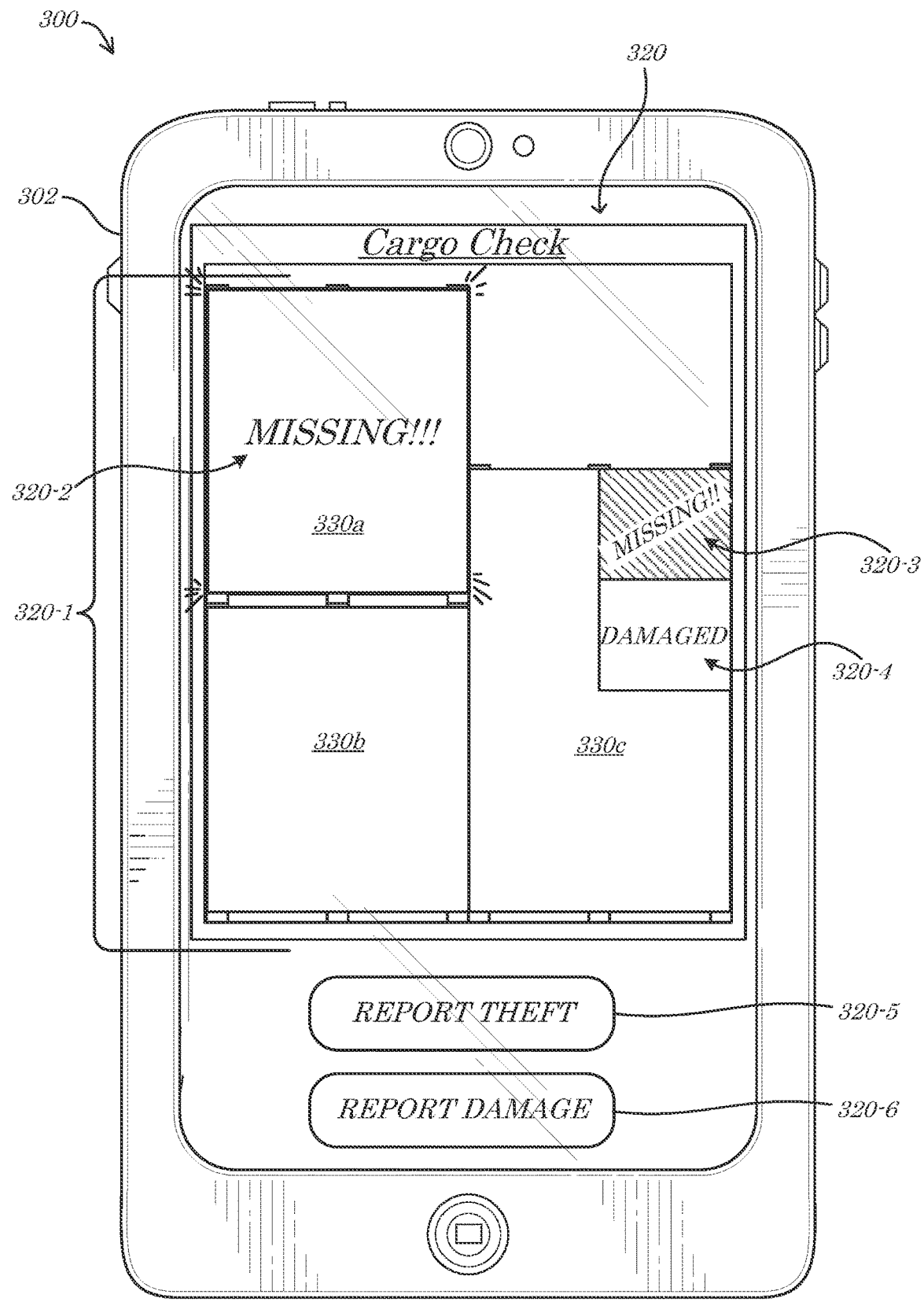
FIG. 3 is a diagram of an example augmented reality interface system according to some embodiments.

Turning now to FIG. 3, a diagram of an example augmented reality interface system 300 according to some embodiments is shown. In some embodiments, the augmented reality interface system 300 may comprise a mobile electronic user device 302 that outputs one or more interfaces 320. According to some embodiments, the interface 320 may comprise one or more of a web page, web form, database entry form, API, spreadsheet, table, and/or application or other GUI via which a user or other entity may receive and/or enter data (e.g., provide or define input) in association with AI theft prevention and recovery, as described herein. The interface 320 may, for example, comprise a front-end of an AI theft/loss prevention and/or recovery program and/or platform programmed and/or otherwise configured to execute, conduct, and/or facilitate the method 400 of FIG. 4 herein, and/or portions thereof. In some embodiments, the interface 320 may be output via one or more computerized and/or specially-programmed computers (e.g., the user devices 102a-b, 202, 302, 502, the third-party device 108, the servers 110, 210, 610 all of FIG. 1, FIG. 2A, FIG. 2B, FIG. 3, FIG. 5A, FIG. 5B, FIG. 5C, FIG. 5D, FIG. 5E, and/or FIG. 6 herein), computer terminals, computer servers, computer systems and/or networks, and/or any combinations thereof (e.g., by one or more multi-threaded and/or multi-core processing units of an online and/or client-server AI object analysis processing system.

According to some embodiments, the interface 320 may comprise one or more tabs and/or other segmented and/or logically-presented data forms, areas, and/or fields. In some embodiments, the interface 320 may be configured and/or organized to allow and/or facilitate management of cargo, supplies, payloads, materials, and/or other objects by facilitating theft and/or damage event identification. According to some embodiments, the interface 320 may comprise an output of a mobile device application that facilitates theft/loss identification by utilizing augmented reality overlays on images/video feed descriptive of cargo or other objects of interest. As depicted in FIG. 3, for example, a first version (or page or instance) of the interface 320 may comprise a "Cargo Check" interface (e.g., defining a first input and/or output mechanism) that provides and/or includes an augmented reality display 320-1, a missing pallet indicator 320-2, a missing crate indicator 320-3, a damaged crate indicator 320-4, a report theft button 320-5, and/or a report damage button 320-6 (e.g., each of which may comprise one or more data entry mechanisms, tools, objects, and/or features). While the interface 320 of FIG. 3 depicts output that is provided as a two-dimensional (2D) representation of, e.g., a rear view of a trailer or storage container, the interface 320 may also or alternatively be provided as a three-dimensional (3D), perspective, top-down or overhead, cross sectional, and/or other view or representation that is or becomes known or practicable. According to some embodiments, the interface 320 may comprise different layers of data for the augmented reality display 320-1, such that a user may scroll or browse through different views to better inspect all items of a cargo or material pile/area, e.g., such that items hidden from view by other items may be readily inspected.

In some embodiments, the first version (or page or instance) of the interface 320 may be utilized by a user (such as a truck driver, cargo loader/unloader, cargo carrier entity, customs official) to readily identify whether one or more objects have been subject to theft, damage, or other loss. An image, video, and/or other sensor-reading display of an object, such as cargo 330a-c (e.g., the cargo 230a-c of FIG. 2A and FIG. 2B), may, for example, be overlaid and/or represented by the augmented reality display 320-1. The augmented reality display 320-1 may comprise, in some embodiments, a virtual representation of the objects identified in the cargo 330a-c and/or may comprise virtual representations and/or graphics overlaid upon a previously captured image/video/etc. of the cargo 330a-c. According to some embodiments, the augmented reality display 320-1 may comprise graphical items overlaid on a live feed from a camera (not shown) of the user device 302. In some embodiments, the live feed or captured image(s) may be compared to previous image/sensor data descriptive of the cargo 330a-c by utilizing AI object detection algorithms as described herein.

According to some embodiments, the augmented reality display 320-1 may generate and display the missing pallet indicator 320-2 on a portion of the augmented reality display 320-1 that is computed to coincide with a previous location of a first item of cargo 330a (e.g., the first cargo pallet 230a of FIG. 2A). In some embodiments, the missing pallet indicator 320-2 may comprise a virtual representation of the size, shape, color, location, and/or other characteristic and/or attribute of a missing cargo pallet comprising the first cargo item 330a. As depicted, the missing pallet indicator 320-2 may comprise a highlighted, animated (e.g., flashing), and/or otherwise distinctive graphical object (e.g., annotated with the descriptor "missing") overlaid on the augmented reality display 320-1 in a position that represents where the first cargo item 330a should be (e.g., was previously located). According to some embodiments, the missing pallet indicator 320-2 may comprise an interactive input/output element. In the case that the missing pallet indicator 320-2 is activated upon a triggering and/or receipt of input from the user (e.g., a properly positioned click of a mouse or other pointer with respect to the missing pallet indicator 320-2), for example, data descriptive of the missing cargo pallet 330a may be provided (e.g., size, weight, ID numbers, content descriptions, value, etc.).

In some embodiments, the augmented reality display 320-1 may generate and display the missing crate indicator 320-3 on a portion of the augmented reality display 320-1 that is computed to coincide with a previous location of a portion of a third item of cargo 330c (e.g., a portion of the third cargo pallet 230c of FIG. 2A and/or FIG. 2B). In some embodiments, the missing crate indicator 320-3 may comprise a virtual representation of the size, shape, color, location, and/or other characteristic and/or attribute of a missing crate of the third item of cargo 330c. As depicted, the missing crate indicator 320-3 may comprise a highlighted, animated (e.g., flashing), and/or otherwise distinctive graphical object (e.g., annotated with the descriptor "missing") overlaid on the augmented reality display 320-1 in a position that represents where the missing crate from the third item of cargo 330c should be (e.g., was previously located). According to some embodiments, the missing crate indicator 320-3 may comprise an interactive input/output element. In the case that the missing crate indicator 320-3 is activated upon a triggering and/or receipt of input from the user (e.g., a properly positioned click of a mouse or other pointer with respect to the missing crate indicator 320-3), for example, data descriptive of the missing crate from the third item of cargo 330c may be provided (e.g., size, weight, ID numbers, content descriptions, value, etc.).

According to some embodiments, areas of damage or other indications of loss that are identified via AI logic object-based analysis may be depicted via the augmented reality display 320-1 by generation of the damaged crate indicator 320-4. The damaged crate indicator 320-4 may comprise, for example, a virtual representation of the size, shape, color, location, and/or other characteristic and/or attribute of a damaged portion of a crate of the third item of cargo 330c. As depicted, the damaged crate indicator 320-4 may comprise a highlighted, animated (e.g., flashing), and/or otherwise distinctive graphical object (e.g., annotated with the descriptor "damaged") overlaid on the augmented reality display 320-1 in a position that represents where the damage to the crate from the third item of cargo 330c is located (e.g., where it has been identified by the AI analysis). According to some embodiments, the damaged crate indicator 320-4 may comprise an interactive input/output element. In the case that the damaged crate indicator 320-4 is activated upon a triggering and/or receipt of input from the user (e.g., a properly positioned click of a mouse or other pointer with respect to the damaged crate indicator 320-4), for example, data descriptive of the identified damage and/or descriptive of the crate from the third item of cargo 330c may be provided (e.g., estimated type of damage, size, weight, ID numbers, content descriptions, value of crate contents, estimated damaged value (e.g., loss amount), etc.).

In some embodiments, the first version (or page or instance) of the interface 320 may comprise either or both of the report theft button 320-5 and the report damage button 320-6. The report theft button 320-5 may be utilized, for example, to report a suspected instance of theft (as indicated by the missing pallet indicator 320-2 and/or the missing crate indicator 320-3) to various entities, such as law enforcement, an insurance carrier, a shipping company, customer, supplier, etc. Selection of the report theft button 320-5 may, in some embodiments, trigger an automatic transmission to such entities (e.g., from the user device 302 and/or a centralized server device—not shown in FIG. 3).

According to some embodiments, the transmission may comprise data descriptive of the missing cargo 330a-c and/or portions of missing cargo (e.g., crates, boxes), data descriptive of a vehicle (not shown) and/or location of the suspected theft, a timestamp, cryptographic information, cargo identifiers, cargo tracking information, etc. Similarly, the report damage button 320-6 may be utilized to report a suspected instance of damage or loss (as indicated by the damaged crate indicator 320-4) to various entities, such as an insurance carrier, a shipping company, customer, supplier, etc. Selection of the report damage button 320-6 may, in some embodiments, trigger an automatic transmission to such entities (e.g., from the user device 302 and/or a centralized server device—not shown in FIG. 3). According to some embodiments, the transmission may comprise data descriptive of the damaged cargo 330a-c and/or portions of damaged cargo (e.g., crates, boxes), data descriptive of characteristics and/or attributes of a vehicle (not shown) and/or location of the damage discovery (e.g., weather conditions, sensor readings), a timestamp, cryptographic information, cargo identifiers, cargo tracking information, etc.

According to some embodiments, the interface 320 may permit a user to selectively report and/or investigate specific identified instances of suspected theft and/or loss. In the case that the user believes the first cargo item 330a is not missing, but has recently been unloaded, for example, the user may select the missing crate indicator 320-3 to designate the missing crate from the third item of cargo 330c for reporting, and then select the report theft button 320-5 to automatically transmit details of the missing crate from the third item of cargo 330c to a pre-programmed entity address (e.g., a law enforcement e-mail address, a security company fax number, a freight company's text reporting number, etc.). In some embodiments, multiple items of cargo 330a-c and/or portions thereof may be selectively designated for reporting to different entities. In such a manner, for example, instances of theft and/or loss may be quickly and easily identified and reported, and any or all relevant information that may be useful for recovery efforts may be automatically provided to various remote and/or relevant parties.

IV. AI Theft Prevention and Recovery Processes

Figure 4:
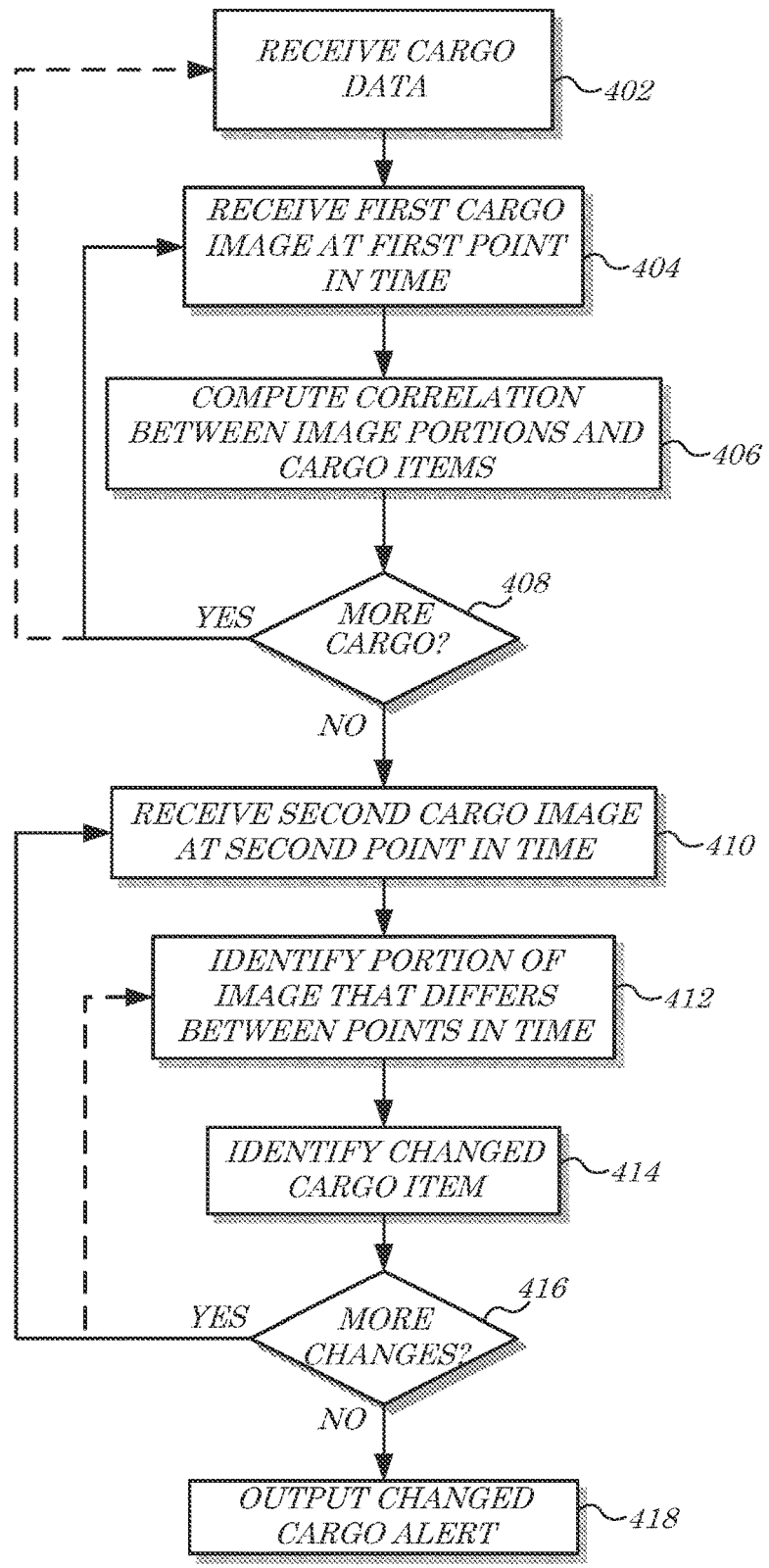
FIG. 4 is a flow diagram of a method according to some embodiments.

Referring now to FIG. 4, a flow diagram of a method 400 according to some embodiments is shown. In some embodiments, the method 400 may be performed and/or implemented by and/or otherwise associated with one or more specialized and/or specially-programmed computers (e.g., the user devices 102a-b, 202, 302, 502, the third-party device 108, the servers 110, 210, 610 all of FIG. 1, FIG. 2A, FIG. 2B, FIG. 3, FIG. 5A, FIG. 5B, FIG. 5C, FIG. 5D, FIG. 5E, and/or FIG. 6 herein), computer terminals, computer servers, computer systems and/or networks, and/or any combinations thereof. In some embodiments, the method 400 may be embodied in, facilitated by, and/or otherwise associated with various input mechanisms and/or interfaces (e.g., the interfaces 220, 520a-e, 620 of FIG. 2A, FIG. 2B, FIG. 5A, FIG. 5B, FIG. 5C, FIG. 5D, FIG. 5E, and/or FIG. 6 herein).

The process diagrams and flow diagrams described herein do not necessarily imply a fixed order to any depicted actions, steps, and/or procedures, and embodiments may generally be performed in any order that is practicable unless otherwise and specifically noted. While the order of actions, steps, and/or procedures described herein is generally not fixed, in some embodiments, actions, steps, and/or procedures may be specifically performed in the order listed, depicted, and/or described and/or may be performed in response to any previously listed, depicted, and/or described action, step, and/or procedure. Any of the processes and methods described herein may be performed and/or facilitated by hardware, software (including microcode), firmware, or any combination thereof. For example, a storage medium (e.g., a hard disk, Random Access Memory (RAM) device, cache memory device, Universal Serial Bus (USB) mass storage device, and/or Digital Video Disk (DVD); e.g., the memory devices 140a-c, 240, 640, 740a-e of FIG. 1, FIG. 2A, FIG. 2B, FIG. 6, FIG. 7A, FIG. 7B, FIG. 7C, FIG. 7D, and/or FIG. 7E herein) may store thereon instructions that when executed by a machine (such as a computerized processor) result in performance according to any one or more of the embodiments described herein.

In some embodiments, the method 400 may comprise receiving (e.g., via an electronic network and/or by an electronic processing device) cargo data (e.g., at or before a first point in time), at 402. A mobile electronic device may be utilized, for example, to input and/or transmit a bill of lading, manifest, Stock Keeping Unit (SKU) list, origin, destination, freight company information, assigned or required vehicle or equipment information, characteristic, quantity, and/or attribute data descriptive of a cargo, payload, materials, contents, supplies, tools, and/or other desired grouping of objects. According to some embodiments, the cargo data may define various attributes, such as size, mass, weight, quantity, IR-signature, color, etc. In some embodiments, the cargo data may comprise a correlation of one or more identifiers (such as SKU identifiers, serial numbers, security tag or seal identifiers) with the attributes and/or characteristics of a unit of cargo/materials/etc. According to some embodiments, the cargo data may be input, acquired, transmitted (e.g., by a user device), and/or received (e.g., by a centralized server device) upon loading, purchase, and/or acquisition of the cargo. Freight loading personnel may, for example, utilize a smartphone executing a specially programmed application to document details of the cargo loaded onto a particular vehicle once the vehicle is loaded.

According to some embodiments, the method 400 may comprise receiving (e.g., via the electronic network and/or by the electronic processing device) at least one first cargo "image" at a first point in time, at 404. The "image" may comprise, for example, a still photo, video footage, and/or a list, table, and/or matrix of data values, e.g., captured, sensed, and/or recorded by a camera and/or other sensor. In some embodiments, the image may be captured at a time after or concurrently with the receiving of the cargo data at 402. According to some embodiments, an AI device, such as a server and/or mobile user device, may comprise both of a Graphics Processing Unit (GPU) to permit real-time analysis of captured data and AI processing logic and/or algorithms for analyzing the captured data. According to some embodiments, images and/or other data captured or sensed by the camera/sensor may be sent to the GPU, which may receive and process the data (e.g., in accordance with stored (software and/or firmware) graphics processing algorithms or rules). In some embodiments, the GPU may send the processed data/images to a Central Processing Unit (CPU) or other logical device that may, for example, receive and process the GPU-processed data/images, e.g., in accordance with stored AI instructions. According to some embodiments, the image may be received by a processing device of a server from a mobile electronic device of a user, such as a freight loader, shipper, etc. In some embodiments, the first image(s) may be captured, acquired, sensed, and/or received automatically by an affixed security camera and/or sensor coupled to detect data descriptive of the cargo/materials.

In some embodiments, the method 400 may comprise computing a correlation (e.g., via AI analysis performed by a CPU and/or processing device) between portions of the at least one image and cargo items, at 406. AI instructions may comprise one or more object detection algorithms, for example, that are coded to identify various types of objects in the image data descriptive of the cargo, such as, but not limited to, boxes, crates, seals, straps, labels, tags, logos, and/or shapes. Object detection algorithms may generally store predefined shapes, colors, and/or patterns that the AI device (e.g., server and/or user device) may utilize to search through captured images/data to identify occurrences of such shapes, colors, and/or patterns, and thereby identify one or more objects comprising the cargo. According to some embodiments, identified objects may be classified into different types, such as boxes, crates, etc. According to some embodiments, information may be acquired from various identified objects, such as product identifiers (from labels), model numbers (from labels and/or logos), serial numbers (from labels or RFID tags), and/or locations (e.g., based on GPS coordinates and/or estimated distances from other objects). In such a manner, for example, various portions of the image(s) may be tagged (e.g., in a memory device) as being associated with certain items identified in the cargo data, such as certain cargo pallets, crates, boxes, shipments, etc.

According to some embodiments, the method 400 may comprise determining (e.g., by the CPU/processing device) whether more cargo should be analyzed, at 408. In the case that no cargo objects/items have been identified and/or correlated (and/or additional objects/items should be identified and/or correlated), the method 400 may proceed back to receiving additional cargo images at 404 (and/or to receiving additional cargo data at 402). In the case that at least one object/item has been identified and/or correlated (at 406) and/or no additional objects/items should be identified, the method 400 may proceed to and/or comprise receiving (e.g., via the electronic network and/or by the electronic processing device) at least one second cargo image at a second point in time, at 410. In some embodiments, the second image(s) may be received by a user device (e.g., as camera and/or sensor input) and/or by a server (e.g., from a user device) at some time after a receiving of the first image(s) at 404. In the case that the first image(s) at 404 are received at a time of loading, delivery, and/or shipping origin, for example, the second image(s) may be captured and/or received at a waypoint (e.g., truck stop/fuel station), destination, transfer point, weigh station, customer and/or job site, etc. According to some embodiments, the second image(s) may be acquired from a similar perspective and/or under similar guidelines as the first image(s), for example, comprising digital photographs taken from a similar vantage point with respect to the cargo/materials. In some embodiments, guidance may be defined and/or output to direct a user to acquire the second image(s) in a manner that is conducive to comparing the second image(s) to the first image(s). The user may be directed by directional guidance prompts output via an interface of the user's mobile device, for example, to position the mobile device at a certain location and/or angle to capture the second image(s) from the desired perspective. In some embodiments, the second image(s) may be captured, acquired, sensed, and/or received automatically by an affixed security camera and/or sensor coupled to detect data descriptive of the cargo/materials.

In some embodiments, the method 400 may comprise identifying (e.g., by the CPU/processing device and/or by a server device and/or a mobile device application) a portion of the images that differs between the points in time, at 412. The AI code may be utilized, for example, to compare the first and second image(s) to identify differences therein. According to some embodiments, such a comparison may comprise matching or aligning the images. Objects and/or features detected and/or identified in the first and second images may, for example, be compared to determine an alignment and/or correlation between the first and second image(s). In the case that the first and second image(s) are not representative of the same angle or perspective of the cargo/materials, for example, objects in the images may be analyzed to achieve an alignment of at least one portion of the first image(s) and at least one portion of the second image(s). According to some embodiments, after matching/corresponding objects have been utilized to align the images, differences between the images may be identified. AI object recognition algorithms may be executed, for example, to identify or locate any objects previously identified in the first image(s) (e.g., and correlated to items of the cargo/materials). In some embodiments, AI-based object analysis may identify one or more objects in the images that have (i) moved, (ii) changed appearance (and/or changed with respect to another attribute, such as heat signature, RF reading), and/or (iii) failed to be located (e.g., in either the first image(s) for newly-identified objects or in the second image(s) for originally-identified objects). According to some embodiments, the type of difference in the identified objects may be classified (e.g., categorized), such as a moved object, a missing object, a new object, and/or a damaged (or presumed damaged) object.

According to some embodiments, the method 400 may comprise identifying (e.g., by the CPU/processing device and/or by a server device and/or a mobile device application) a changed cargo item, at 414. Based on the correlation at 406, for example, any objects identified as changed (at 412) within the images between the two points in time, may be cross-referenced with known/identified items of cargo, e.g., as identified by the cargo data received at 402. In some embodiments, the classification of the change may be analyzed with respect to the particular item of cargo to derive and/or compute a status classification. In the case of living cargo, such as a horse, for example, since movement is to be expected, an identified movement of the item may be classified as "acceptable" or as a non-event. In the case of a fragile item packed in a shipping crate with a certain end intended to face upwards, however, a tipping, rotation, or other movement that exceeds a threshold (e.g., linear and/or radial) may be classified as excessive movement, potential damage, rough handling, etc. In some embodiments, a status classification may be calculated or computed for each item of cargo that can be identified by the AI logic. In some embodiments, the AI logic may be specifically trained to identify normal or expected movements or changes such as shifting cargo items, moving livestock, and/or changes in appearance due to different lighting, timing, or other conditions.

According to some embodiments, the method 400 may comprise determining (e.g., by the CPU/processing device) whether there are (or should be) more changes, at 416. In the case that no changes in or of objects/items have been identified (and/or additional changes and/or objects/items should be identified), for example, the method 400 may proceed back to capture or receive more second images/data at 410 (and/or identify more changes/differences at 412). In some embodiments, the AI image/object analysis may be scheduled to automatically occur at various times. In such embodiments, the capturing and/or receiving of second images/data at 410, the identifying of changes in the images at 412, and/or the identifying of the changes in the cargo items at 414 may proceed and/or be repeated automatically upon certain triggering events (e.g., vehicle stops, elapsed miles driven, detection of bumps, tipping, or hard stops, detection of an opened trailer/cargo door, detection of excessive noise levels, etc.) and/or upon expiration of a predefined time period/window (e.g., every hour). In some embodiments, the AI analysis (at 410, 412, 414) may be selectively initiated and/or triggered by user input. The driver of a tractor trailer may, for example, select a button on an interface of a mobile electronic device to initiate an AI scan of a payload to check on the status of the freight items being hauled. In the case of a self-driving and/or autonomous vehicle, the AI and/or other driving logic may automatically initiate the payload scan based on stored rules and/or logic. In some embodiments, a contractor may selectively initiate a scan of a pile of lumber and/or other materials upon arriving at a jobsite in the morning to check and make sure that no theft has occurred overnight.

In the case that no more input and/or analysis is available and/or needed, the method 400 may proceed to output a changed cargo alert, at 418. In some embodiments, the user's mobile device and/or an in-vehicle device may be utilized to output status check results at various points in time (e.g., at the close of a time window). According to some embodiments, a cargo sensor may comprise a short-range communication device operable to transmit an indication of the cargo status (e.g., images, sensor data, calculations) to the vehicle and/or to a mobile electronic device (e.g., a smart phone) utilized by a driver thereof. In some embodiments, the result/status may be output via a webpage served by a web server in communication with the sensor and, e.g., displayed via a user's mobile device. According to some embodiments, a specially programmed mobile device application of a user's device may be coded to receive and/or capture image data (e.g., from the sensor device and/or from an integrated sensor/camera), process the data, transmit the data to a server, and/or receive cargo status AI-processing results from the server (e.g., an AI algorithm execution server) that operates in conjunction therewith. In some embodiments, the method 400 may comprise reeving user input and/or commands in response to the cargo status. The user may review possible instances of theft, damage, and/or other loss or concern, for example, and may provide input that triggers an alert, notification, and/or report to be transmitted to a third-party, such as a law enforcement agency, customs, border, or import agency, insurance carrier, freight carrier, freight broker, shipper, supplier, customer, etc. According to some embodiments, alerts, notifications, and/or reports may be automatically sent based on stored rules and stored contact/address information.

V. AI Theft Prevention and Recovery Interfaces

Turning now to FIG. 5A, FIG. 5B, FIG. 5C, FIG. 5D, and FIG. 5E, diagrams of an example interface system 500 according to some embodiments are shown. In some embodiments, the interface system 500 may comprise a mobile electronic user device 502 that outputs one or more interfaces 520*a-e*. According to some embodiments, the interfaces 520*a-e* may comprise one or more of a web page, web form, database entry form, API, spreadsheet, table, and/or application or other GUI via which a user or other entity may receive and/or enter data (e.g., provide or define input) in association with AI theft prevention and recovery, as described herein. The interfaces 520*a-e* may, for example, comprise a front-end of an AI theft prevention and recovery program and/or platform programmed and/or otherwise configured to execute, conduct, and/or facilitate the method 400 of FIG. 4 herein, and/or portions thereof. In some embodiments, the interfaces 520*a-e* may be output via one or more computerized and/or specially-programmed computers (e.g., the user devices 102*a-b*, 202, 302, 502, the third-party device 108, the servers 110, 210, 610 all of FIG. 1, FIG. 2A, FIG. 2B, FIG. 3, FIG. 5A, FIG. 5B, FIG. 5C, FIG. 5D, FIG. 5E, and/or FIG. 6 herein), computer terminals, computer servers, computer systems and/or networks, and/or any combinations thereof (e.g., by one or more multi-threaded and/or multi-core processing units of an online and/or client-server AI object analysis processing system).

Figure 5A:
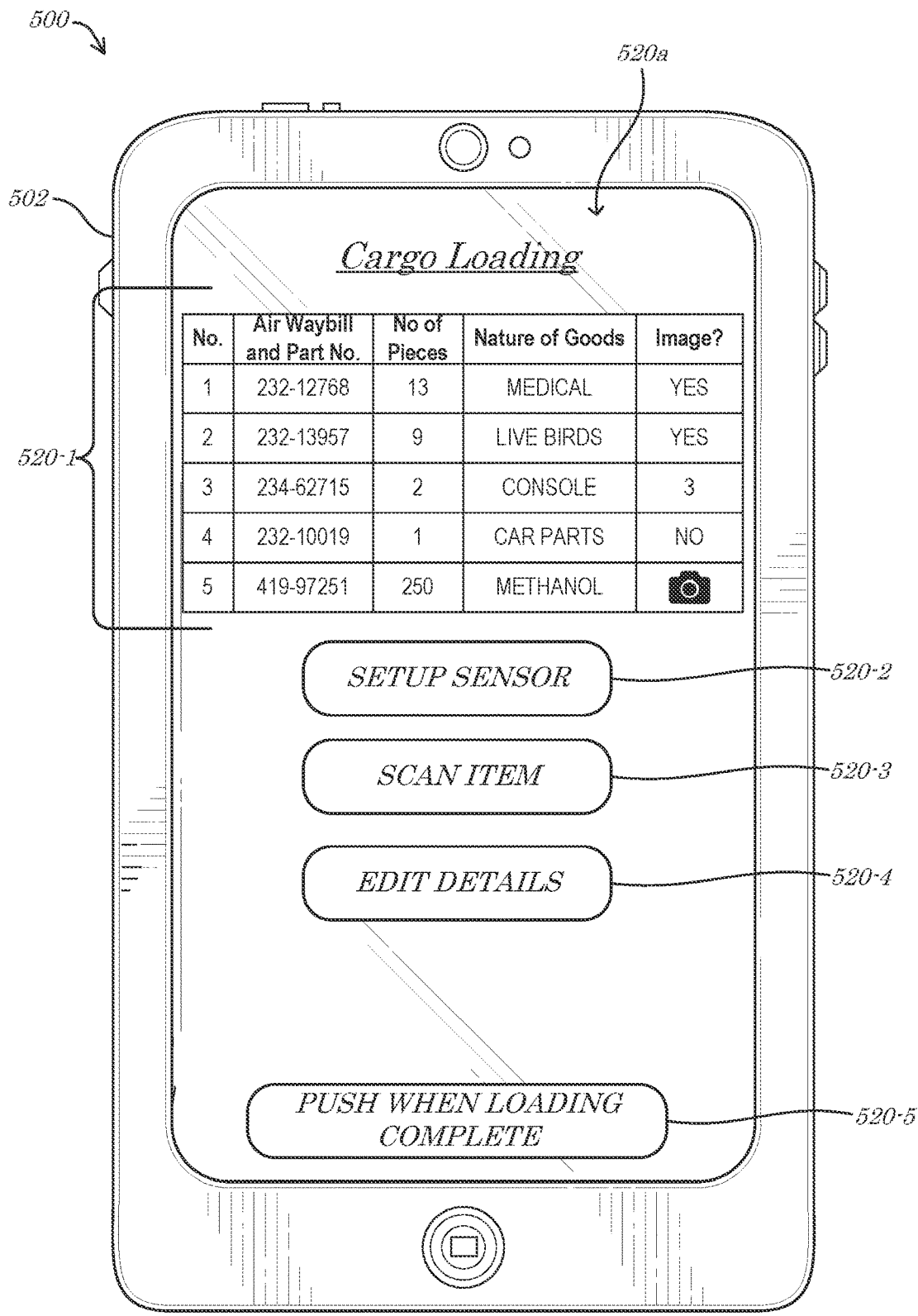
FIG. 5A, FIG. 5B, FIG. 5C, FIG. 5D, and FIG. 5E are diagrams of an example interface system according to some embodiments.

According to some embodiments, the interfaces 520*a-e* may comprise one or more tabs and/or other segmented and/or logically-presented data forms and/or fields. In some embodiments, the interfaces 520*a-e* may be configured and/or organized to allow and/or facilitate viewing, retrieval, and/or selection of various object identification, theft/loss event identification, cargo status, and/or theft/loss reporting data, e.g., for a particular location, driver, group of drivers, and/or vehicle or group of vehicles (e.g., a fleet). According to some embodiments, the interfaces 520*a-e* may comprise a menu or "home" page from which a user may select one or more options that initiate specific functionality of a mobile device application. As depicted in FIG. 5A, for example, a first version (or page or instance) of the interface 520*a* may comprise a "Cargo Loading" interface (e.g., defining a first input and/or output mechanism) that provides and/or includes a cargo manifest 520-1, a setup sensor button 520-2, a scan item button 520-3, an edit details button 520-4, and/or "Push When Loading Complete" button 520-5 (e.g., each of which may comprise one or more data entry mechanisms, tools, objects, and/or features).

In some embodiments, the first version (or page or instance) of the interface 520*a* may be utilized by a user, such as a cargo loader/rigger to document cargo loaded into/onto a vehicle. Each item loaded may be scanned, imaged, and/or entered into the manifest 520-1, for example, as it is loaded. In some embodiments, data defining the manifest 520-1 and/or a portion thereof may be received (e.g., downloaded) from one or more remote devices (not shown; such as the third-party device 108 of FIG. 1 herein). According to some embodiments, the setup sensor button 520-2 may be utilized to initialize and/or configure a sensor coupled to an item of cargo and/or to the vehicle (e.g., a trailer security sensor). In some embodiments, the scan item button 520-3 may be utilized to enter a new item or group of items into the manifest 520-1. The scan item button 520-3 may, for example, cause a camera and/or other sensor (not shown) to capture images, video, audio, and/or sensor data, such as temperature, humidity, and/or light readings, etc., descriptive of one or more items of cargo. In some embodiments, the scan item button 520-3 may cause a barcode or other machine-readable indicia to be interrogated, read, and/or decoded. According to some embodiments, the scan item button 520-3 may cause an AI object-based analysis of image data to identify loaded items and/or to correlate identified objects to items already entered into the manifest 520-1. The edit details button 520-4 may, for example, be utilized by the user/loader to enter and/or modify details defining characteristics and/or attributes of cargo items. In some embodiments, acceptable temperature, light, humidity, and/or vibration thresholds, safety data (e.g., flash points, hazardous material parameters), and/or weights and dimensions may be entered into the manifest 520-1 and/or stored in association with items identified by the manifest 520-1. In some embodiments, the "Push When Loading Complete" button 520-5 may, upon a triggering and/or receipt of input from the user (e.g., a properly positioned click of a mouse or other pointer with respect to the "Push When Loading Complete" button 520-5), call, initialize, and/or cause a generation of a second version (or page or instance) of the interface 520*b*.

Figure 5B:
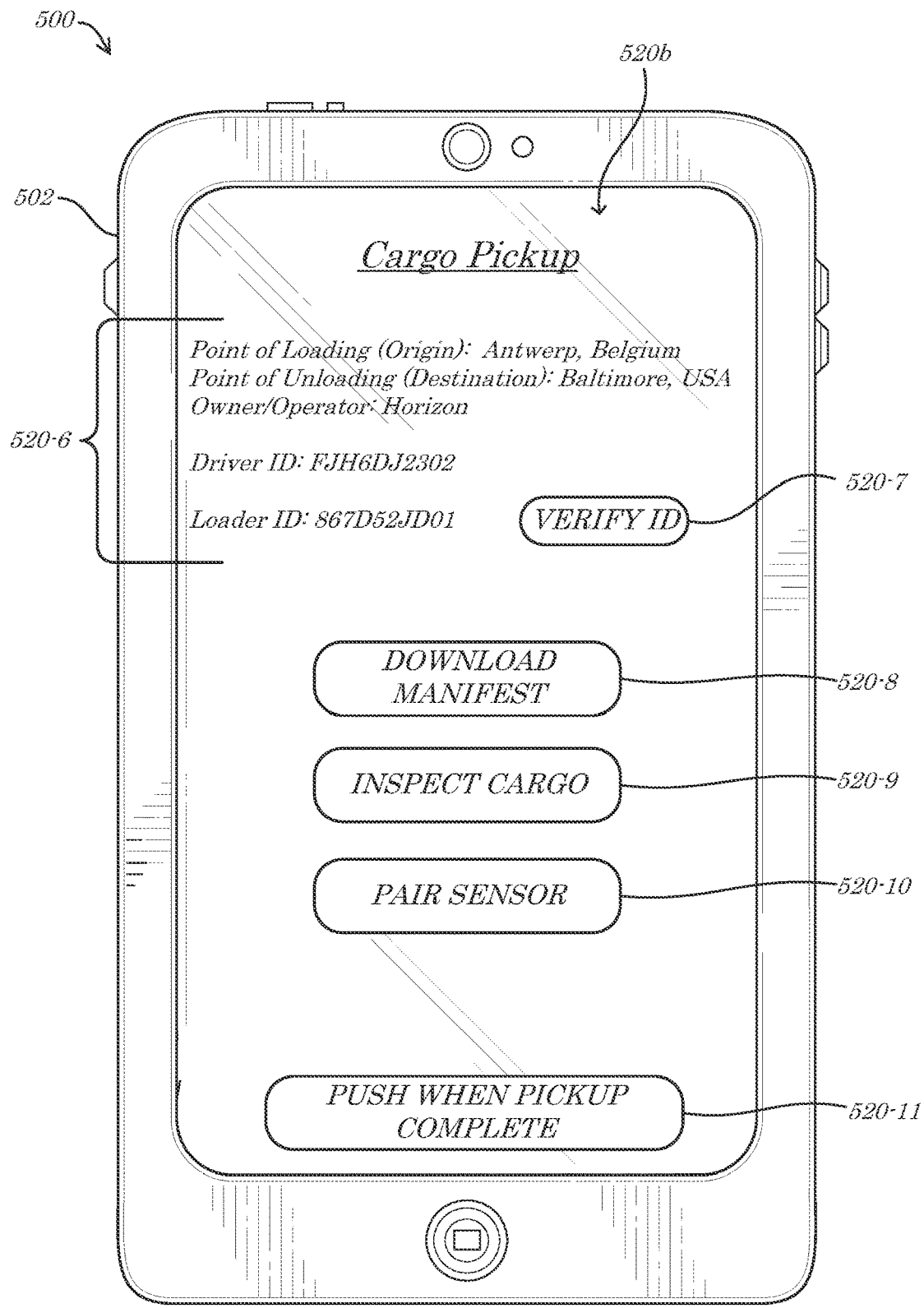

As depicted in FIG. 5B, for example, the second version (or page or instance) of the interface 520*b* may comprise a "Cargo Pickup" interface (e.g., defining a second input and/or output mechanism) that provides and/or includes shipment details 520-6, a verify ID button 520-7, a download manifest button 520-8, an inspect cargo button 520-9, a pair sensor button 520-10, and/or "Push When Pickup Complete" button 520-11 (e.g., each of which may comprise one or more data entry mechanisms, tools, objects, and/or features). In some embodiments, the second version (or page or instance) of the interface 520*b* may be utilized by a user, such as a freight hauler or driver, to document and/or verify transfer of custody of the cargo from the loader to the driver. The driver may readily view the shipment details 520-6 to verify that the correct cargo is being picked up, for example, and/or may select the verify ID button 520-7 to authenticate the loader, rigging company, supplier, etc. The verify ID button 520-7 may permit the driver to view a photo of authorized loading personnel, for example, and/or may initiate a cryptographic routine to authenticate a code or identifier provided by the loader.

According to some embodiments, the loader may perform a similar function on an alternate version of the second version of the interface 520*b* (not shown) to verify the driver's credentials and/or identity. In some embodiments, the download manifest button 520-8 may be utilized to query, pull, and/or acquire a copy of the manifest 520-1 from the loader. The user device 502 of FIG. 5B may be utilized by the driver, for example, to download a copy of the manifest 520-1 directly from the user device 502 utilized by the loader in FIG. 5A. According to some embodiments, in the case that the manifest 520-1 is saved remotely, e.g., to a server (not shown), the user device 502 may access the server to download the manifest 520-1. In some embodiments, the manifest 520-1 may only be capable of being downloaded by the driver in the case that the driver's identify is verified by the loader or in the case that the loader otherwise enables the user device 502 to access the information.

In some embodiments, the inspect cargo button 520-9 may be utilized to initiate an AI scan of the cargo and/or cargo images and/or sensor data to set a baseline for the characteristics and/or attributes of the cargo and/or to verify that the cargo characteristics and/or attributes match those as detailed in or stored in relation to the manifest 520-1. According to some embodiments, the inspect cargo button 520-9 may initiate an AI routine that is specially programmed to identify proper or improper loading of goods. In some embodiments, the inspect cargo button 520-9 may cause an interrogation of one or more sensors coupled to detect information descriptive of the cargo.

According to some embodiments, the pair sensor button 520-10 may be utilized to initiate communications between the user device 502 and a sensor (not shown) associated with the cargo. One or more short-range wireless cameras, RFID devices, GPS devices, light sensors, weight sensors, temperature sensors, humidity sensors, etc., may, for example, be connected to the user device 502 by sharing various electronic handshake data, identifiers, codes, cryptographic keys, etc. According to some embodiments, the loader may authorize the pairing and/or provide the necessary keys and/or codes to the driver so that the driver may receive data from any utilized cargo sensors. In some embodiments, the "Push When Pickup Complete" button 520-11 may, upon a triggering and/or receipt of input from the user (e.g., a properly positioned click of a mouse or other pointer with respect to the "Push When Pickup Complete" button 520-11), call, initialize, and/or cause a generation of a third version (or page or instance) of the interface 520c.

Figure 5C:
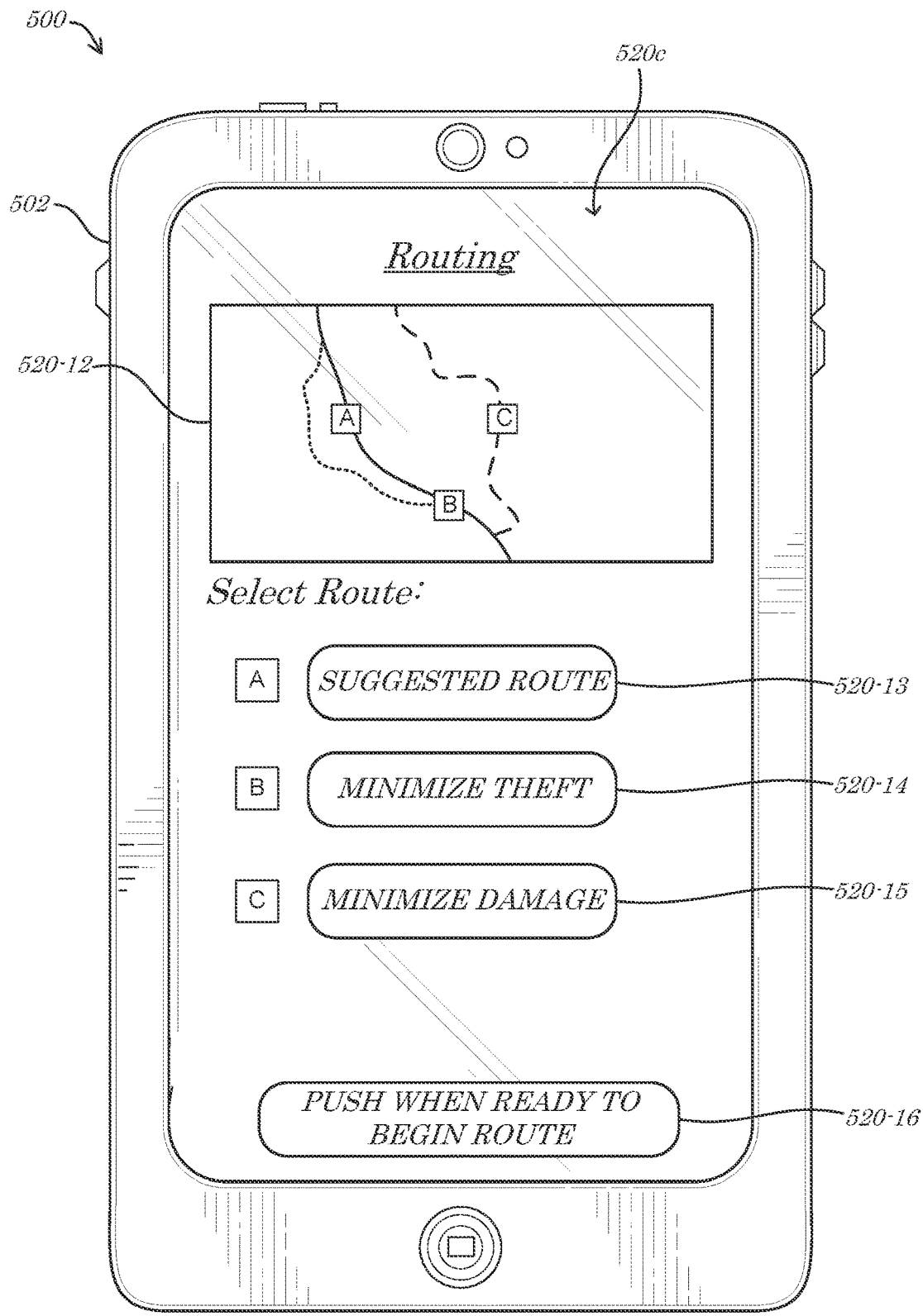

As depicted in FIG. 5C, for example, the third version (or page or instance) of the interface 520c may comprise a "Routing" interface (e.g., defining a third input and/or output mechanism) that provides and/or includes a routing map 520-12, a suggested route button 520-13, a minimize theft button 520-14, a minimize damage button 520-15, and/or "Push When Ready to Begin Route" button 520-16 (e.g., each of which may comprise one or more data entry mechanisms, tools, objects, and/or features). In some embodiments, the third version (or page or instance) of the interface 520c may be utilized by a user, such as a freight hauler or driver, to plan, select, and/or begin traversal of a route for delivery of the cargo. According to some embodiments, AI logic and/or algorithms may be utilized to suggest multiple routes "A", "B", and/or "C" to the driver. As depicted in FIG. 5C, each of the available and/or suggested routes may be output and/or depicted to the driver via the routing map 520-12. In some embodiments, characteristics and/or attributes of the payload, cargo, and/or materials/contents may be utilized to compute the routes "A", "B", and/or "C" and the driver/user may review and/or select one or more of the routes "A", "B", and/or "C" by activation of a respective one of the suggested route button 520-13, the minimize theft button 520-14, and/or the minimize damage button 520-15.

According to some embodiments, the suggested route that may be chosen via the suggested route button 520-13 may comprise a route calculated to achieve the lowest possible expected likelihood of theft and damage to the cargo. Historic loss data may be analyzed to determine, for example, roads, areas, times of day, weather conditions, and/or other variables that have statistically been associated with higher likelihood of loss. In some embodiments, these likelihoods may be based on cargo type, vehicle type, and/or driver identity. According to some embodiments, the type of cargo (and/or one or more attributes and/or characteristics thereof, such as weight, temperature thresholds, packing materials used) may be utilized to identify route attributes that contribute to increases in likelihood of theft and/or damage. It may be determined, for example, that refrigerated goods tend to experience heat damage (even when transported in reefer trailers) when a first route has been taken for delivery, but experience less tendency for heat damage when a second route has been taken. Similarly, it may be determined that flat screen TVs experience a higher level of theft when transported through certain truck stops in a certain area, but a lower level of theft when stops are made at standard fueling stations. According to some embodiments, route plans culminating in the lowest calculated likelihood of theft may be suggested and/or selected via the minimize theft button 520-14, and/or route plans culminating in the lowest calculated likelihood of damage may be suggested and/or selected via the minimize damage button 520-15.

Figure 5D:
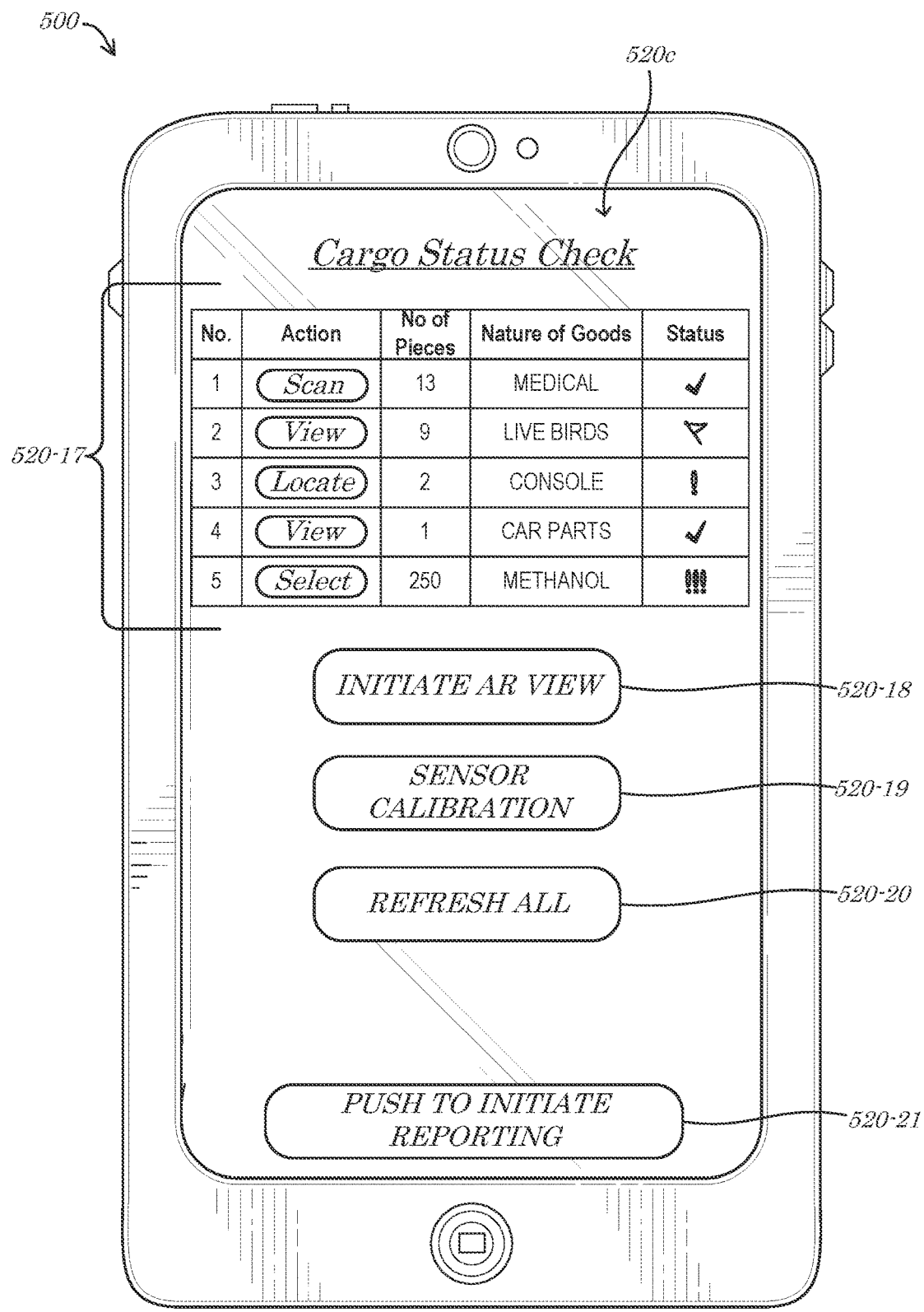

In some embodiments, the "Push When Ready to Begin Route" button 520-16 may, upon a triggering and/or receipt of input from the user (e.g., a properly positioned click of a mouse or other pointer with respect to the "Push When Ready to Begin Route" button 520-16), call, initialize, and/or cause a generation of a routing application interface (not shown) and/or a fourth version (or page or instance) of the interface 520d. As depicted in FIG. 5D, for example, the fourth version (or page or instance) of the interface 520d may comprise a "Cargo Status Check" interface (e.g., defining a fourth input and/or output mechanism) that provides and/or includes a status manifest 520-17, an initiate AR view button 520-18, a sensor calibration button 520-19, a "refresh all" button 520-20, and/or "Push to Initiate Reporting" button 520-21 (e.g., each of which may comprise one or more data entry mechanisms, tools, objects, and/or features). According to some embodiments, the fourth version (or page or instance) of the interface 520d may be provided in response to an automated cargo check performed at predefined time intervals, in response to a triggering event (e.g., a temperature or other sensor threshold violation), and/or randomly. In some embodiments, the fourth version (or page or instance) of the interface 520d may be utilized by a user, such as a freight hauler or driver, to view, update, and/or manage the status of the transported cargo. According to some embodiments, the status manifest 520-17 may comprise an indication of the status of one or more items of cargo and/or may include selectable options for scanning, viewing, locating, and/or selecting various items of cargo. In some embodiments, the initiate AR view button 520-18 may cause an AR interface (not shown; such as the interface 320 of FIG. 3) to be displayed to the user, via which the user may view graphical representations of the status of various cargo items. According to some embodiments, the sensor calibration button 520-19 may allow the user to calibrate, reset, and/or manage one or more cargo sensors, e.g., to reduce false positive alarms and/or to account for local environmental conditions (such as high humidity areas, rough roads, extreme cold areas). In some embodiments, the "refresh all" button 520-20 may allow the user to query and/or update all available status metrics at once, e.g., as opposed to selectively reviewing and/or checking individual items from the status manifest 520-17.

Figure 5E:
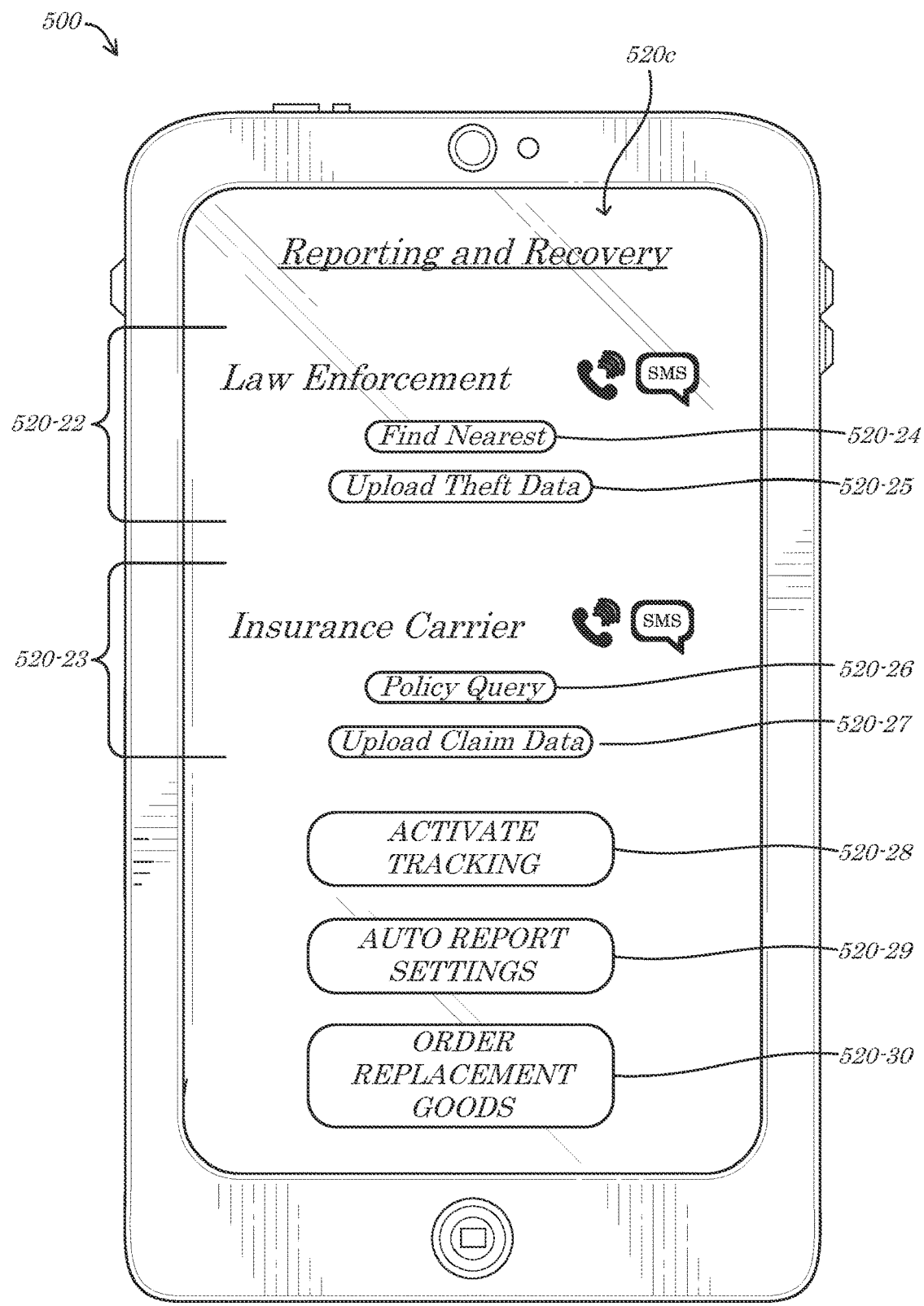

According to some embodiments, the "Push to Initiate Reporting" button 520-21 may, upon a triggering and/or receipt of input from the user (e.g., a properly positioned click of a mouse or other pointer with respect to the "Push to Initiate Reporting" button 520-21), call, initialize, and/or cause a generation of a fifth version (or page or instance) of the interface 520e. As depicted in FIG. 5E, for example, the fifth version (or page or instance) of the interface 520e may comprise a "Reporting and Recovery" interface (e.g., defining a fifth input and/or output mechanism) that provides and/or includes law enforcement contact data 520-22, insurance carrier contact data 520-23, a find nearest police button 520-24, an upload theft data button 520-25, a policy query button 520-26, an upload claim data button 520-27, an activate tracking button 520-28, an auto report settings button 520-29, and/or an order replacement goods button 520-30 (e.g., each of which may comprise one or more data entry mechanisms, tools, objects, and/or features). In some embodiments, the fifth version (or page or instance) of the interface 520e may be utilized by a driver, contractor, and/or other user to report a theft and/or loss event, e.g., that has been automatically identified by AI analysis.

According to some embodiments, the law enforcement contact data 520-22 may comprise data identifying one or more law enforcement agencies that may be contacted to report a theft event. The law enforcement contact data 520-22 may comprise, for example, links, buttons, and/or features to permit the user to place a phone call and/or initiate a text messaging session with the identified agency. In some embodiments, the find nearest police button 520-24 may be utilized to automatically search for and/or identify a local police authority (e.g., in the case that the cargo is in-transit and the driver is unfamiliar with the local police contact information). According to some embodiments, the upload theft data button 520-25 may be utilized to automatically transmit one or more files and/or data elements descriptive of the stolen cargo to the identified agency. The transmitted data may comprise, for example, images of the cargo, identification numbers, sensor and/or tracking data, value information, theft event location, time, etc.

In some embodiments, the insurance carrier contact data 520-23 may comprise data identifying an insurance carrier, bonding agent, broker, and/or other underwriting agency that may be contacted to file a claim based on a loss event (e.g., theft and/or damage). The insurance carrier contact data 520-23 may comprise, for example, links, buttons, and/or features to permit the user to place a phone call and/or initiate a text messaging session with the identified carrier/agency. In some embodiments, the policy query button 520-26 may be utilized to automatically access and/or evaluate insurance policy terms, such as deductibles, loss parameters, coverage limits, etc. According to some embodiments, the upload claim data button 520-27 may be utilized to automatically transmit one or more files and/or data elements descriptive of the stolen and/or damaged cargo to the identified carrier/agency. The transmitted data may comprise, for example, images of the cargo, identification numbers, sensor and/or tracking data, value information, theft and/or damage event location, time, etc.

According to some embodiments, the activate tracking button 520-28 may be utilized to initialize an active tracking device associated with stolen cargo items. A GPS or other satellite-based communication, tracking, and/or location homing device may be activated, for example, so that the stolen goods may be tracked down. In some embodiments, the auto report settings button 520-29 may be utilized to access, set, and/or edit various parameters, contact data, and/or preferences regarding how and/or when parties may be automatically contacted based on triggering events. According to some embodiments, the order replacement goods button 520-30 may be utilized to automatically place an order for additional goods to replace any stolen and/or damaged goods. In such a manner, for example, the delay in shipping and/or receiving of the full complement of cargo items may be minimized by quickly initiating replacements.

While various components of the interfaces 520a-e have been depicted with respect to certain labels, layouts, headings, titles, and/or configurations, these features have been presented for reference and example only. Other labels, layouts, headings, titles, and/or configurations may be implemented without deviating from the scope of embodiments herein. Similarly, while a certain number of tabs, information screens, form fields, and/or data entry options have been presented, variations thereof may be practiced in accordance with some embodiments.

VI. AI Driving Analysis and Incentive Apparatus and Articles of Manufacture

Figure 6:
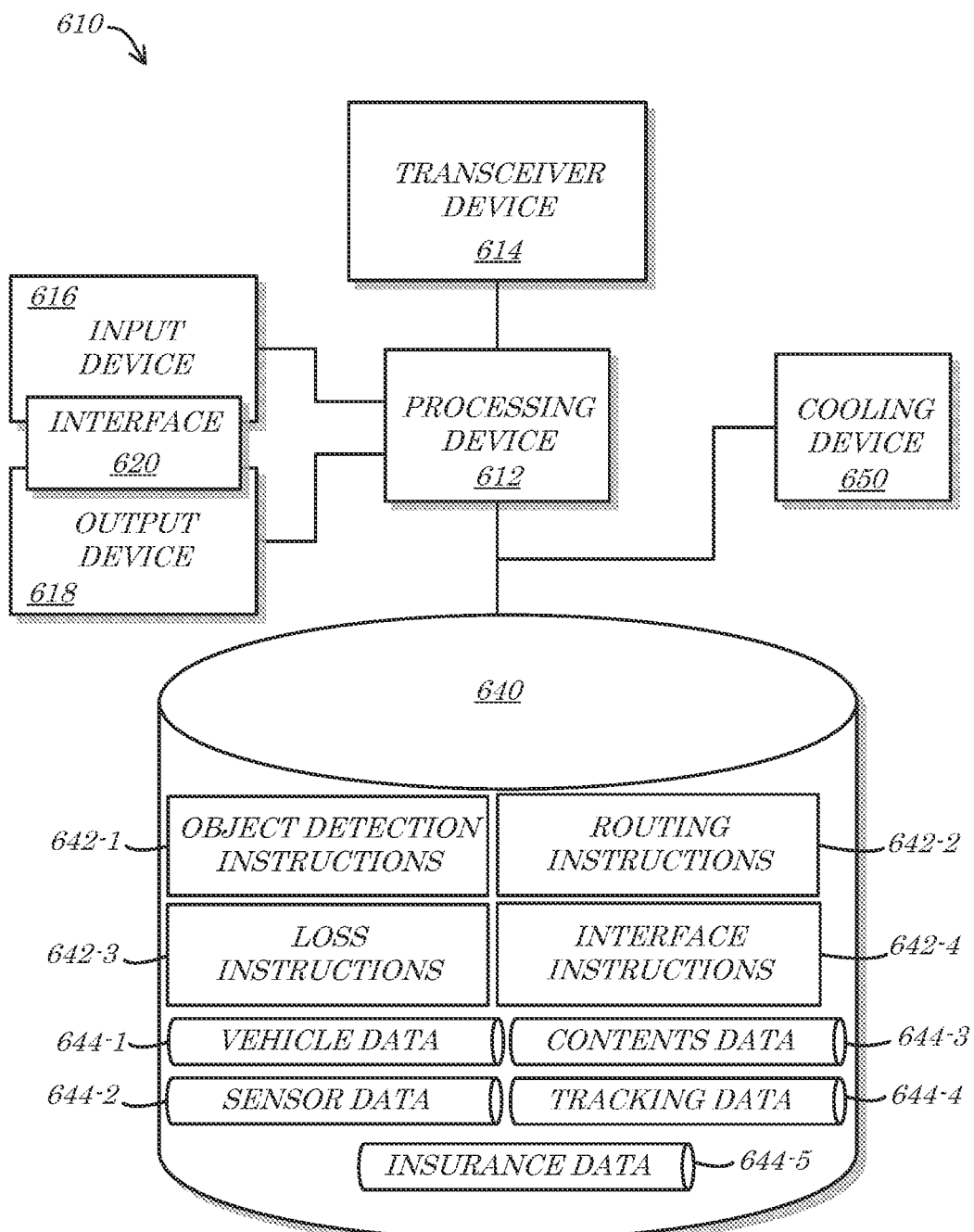
FIG. 6 is a block diagram of an apparatus according to some embodiments.
Figure 7A:
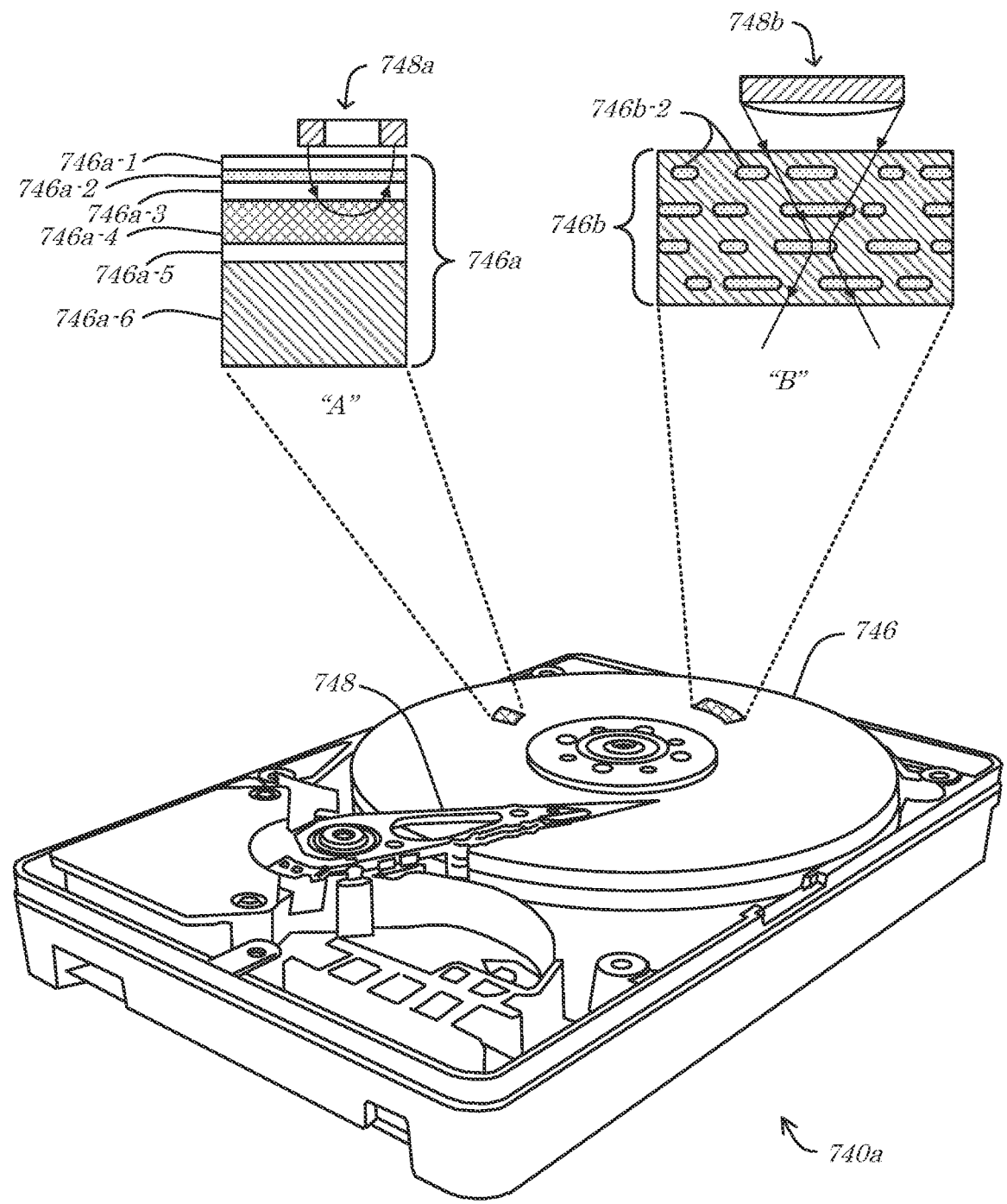
FIG. 7A, FIG. 7B, FIG. 7C, FIG. 7D, and FIG. 7E are perspective diagrams of exemplary data storage devices according to some embodiments.
Figure 7B:
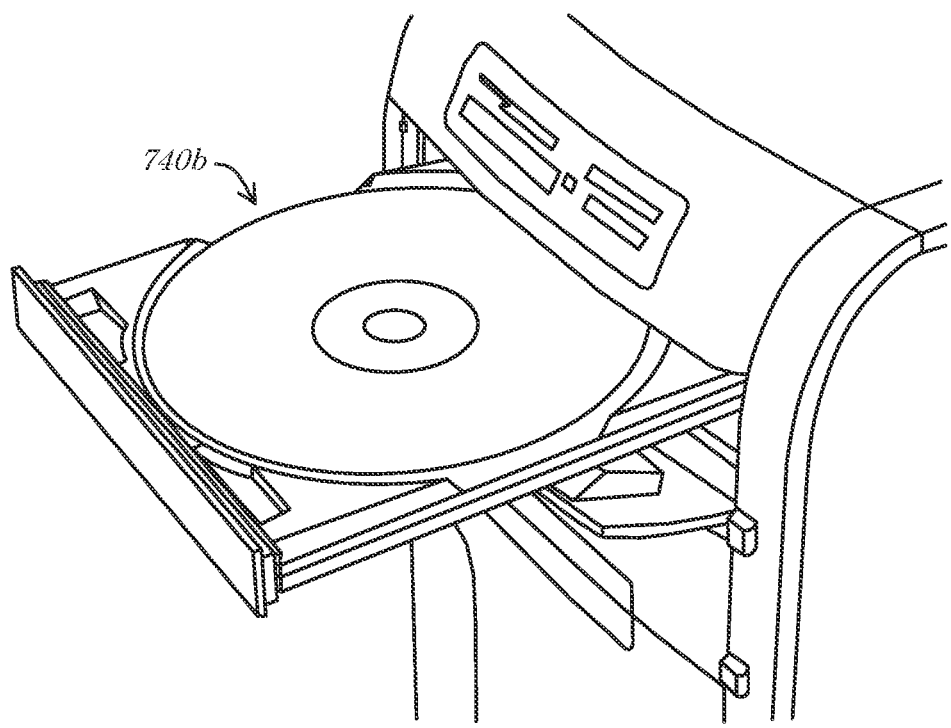
Figure 7C:
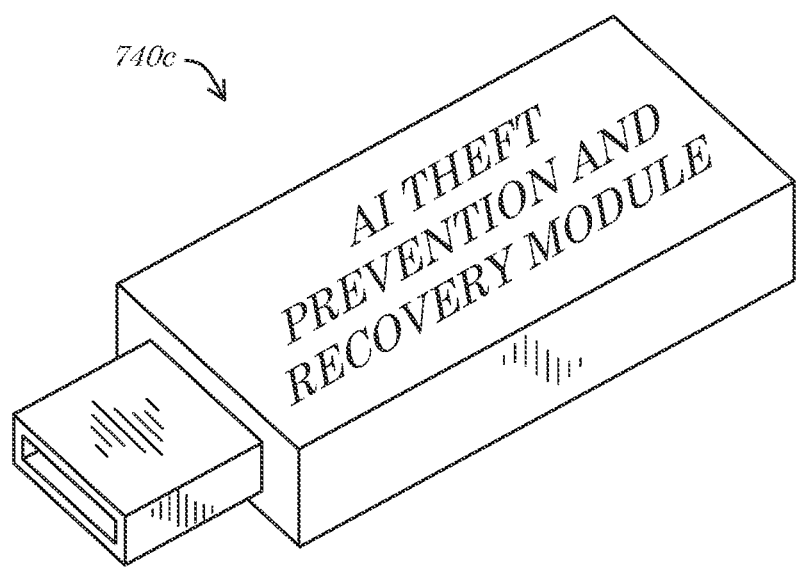
Figure 7D:
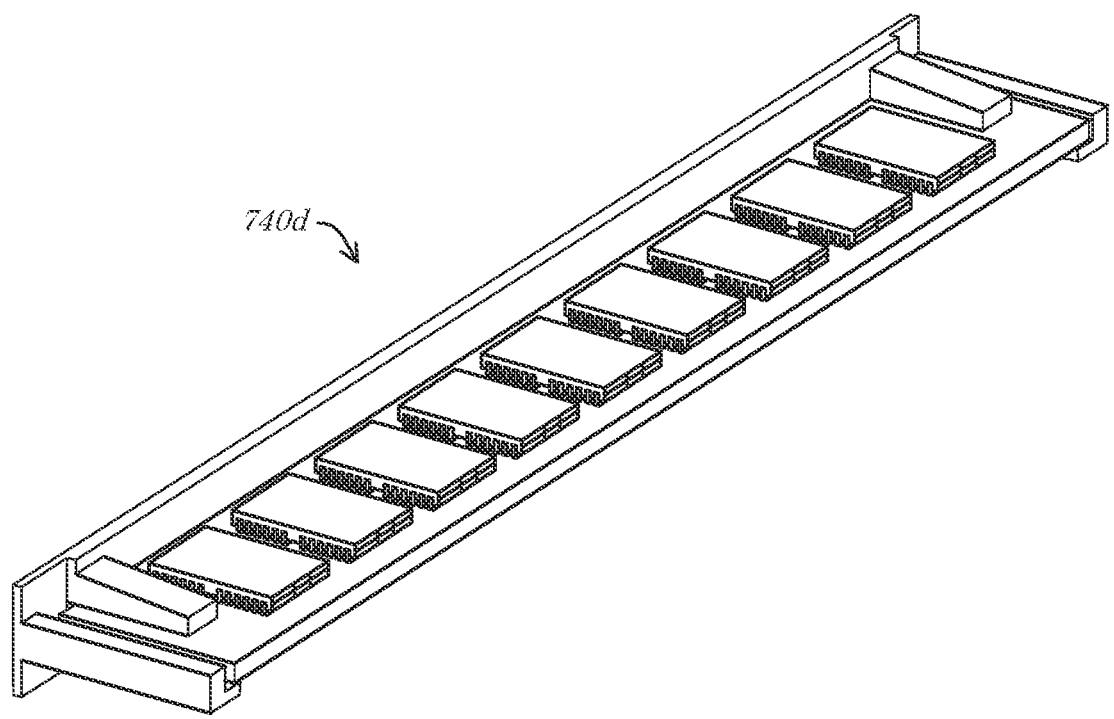
Figure 7E:
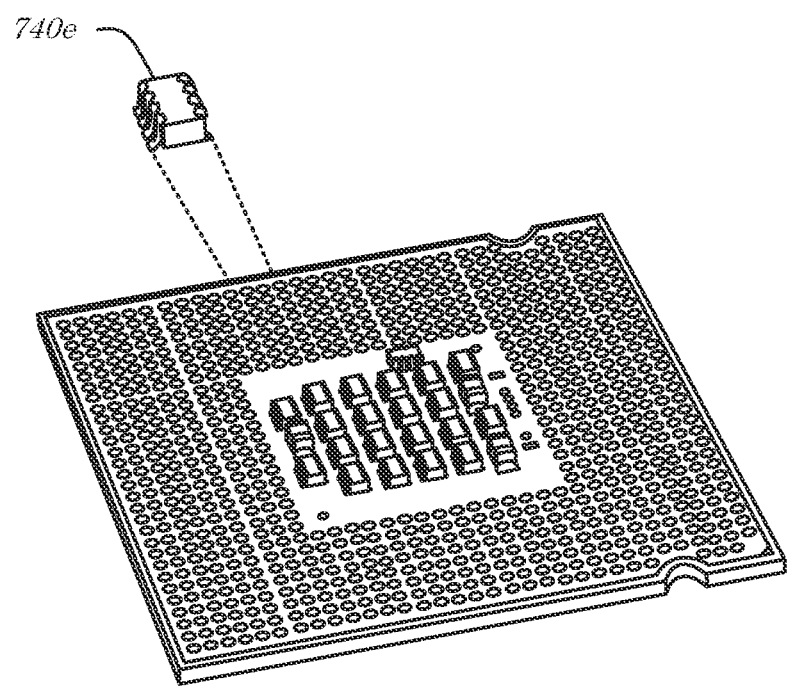

Turning to FIG. 6, a block diagram of an AI device or other apparatus 610 according to some embodiments is shown. In some embodiments, the apparatus 610 may be similar in configuration and/or functionality to any of the user devices 102a-b, 202, 302, 502, the third-party device 108, the servers 110, 210, 610 all of FIG. 1, FIG. 2A, FIG. 2B, FIG. 3, FIG. 5A, FIG. 5B, FIG. 5C, FIG. 5D, FIG. 5E, and/or FIG. 6 herein. The apparatus 610 may, for example, execute, process, facilitate, and/or otherwise be associated with the method 400 of FIG. 4 herein, and/or portions thereof. In some embodiments, the apparatus 610 may comprise a processing device 612, a transceiver device 614, an input device 616, an output device 618, an interface 620, a memory device 640 (storing various programs and/or instructions 642 and data 644), and/or a cooling device 650. According to some embodiments, any or all of the components 612, 614, 616, 618, 620, 640, 642, 644, 650 of the apparatus 610 may be similar in configuration and/or functionality to any similarly named and/or numbered components described herein. Fewer or more components 612, 614, 616, 618, 620, 640, 642, 644, 650 and/or various configurations of the components 612, 614, 616, 618, 620, 640, 642, 644, 650 be included in the apparatus 610 without deviating from the scope of embodiments described herein.

According to some embodiments, the processor 612 may be or include any type, quantity, and/or configuration of processor that is or becomes known. The processor 612 may comprise, for example, an Intel® IXP 2800 network processor or an Intel® XEON™ Processor coupled with an Intel® E6501 chipset. In some embodiments, the processor 612 may comprise multiple inter-connected processors, microprocessors, and/or micro-engines. According to some embodiments, the processor 612 (and/or the apparatus 610 and/or other components thereof) may be supplied power via a power supply (not shown), such as a battery, an Alternating Current (AC) source, a Direct Current (DC) source, an AC/DC adapter, solar cells, and/or an inertial generator. In the case that the apparatus 610 comprises a server, such as a blade server, necessary power may be supplied via a standard AC outlet, power strip, surge protector, and/or Uninterruptible Power Supply (UPS) device.

In some embodiments, the transceiver device 614 may comprise any type or configuration of communication device that is or becomes known or practicable. The transceiver device 614 may, for example, comprise a Network Interface Card (NIC), a telephonic device, a cellular network device, a router, a hub, a modem, and/or a communications port or cable. According to some embodiments, the transceiver device 614 may also or alternatively be coupled to the processor 612. In some embodiments, the transceiver device 614 may comprise an IR, RF, Bluetooth™, Near-Field Communication (NFC), and/or Wi-Fi® network device coupled to facilitate communications between the processor 612 and another device (not shown).

According to some embodiments, the input device 616 and/or the output device 618 may be communicatively coupled to the processor 612 (e.g., via wired and/or wireless connections and/or pathways) and they may generally comprise any types or configurations of input and output components and/or devices that are or become known, respectively. The input device 616 may comprise, for example, a keyboard that allows an operator of the apparatus 610 to interface with the apparatus 610 (e.g., a driver to retrieve AI cargo status data, as described herein). The output device 618 may, according to some embodiments, comprise a display screen and/or other practicable output component and/or device. The output device 618 may, for example, provide an interface (such as the interface 620 and/or the interfaces 320, 520a-e of FIG. 3, FIG. 5A, FIG. 5B, FIG. 5C, FIG. 5D, and/or FIG. 5E herein) via which AI theft prevention and/or recovery data or information is provided to a user (e.g., via a website and/or mobile application). According to some embodiments, the input device 616 and/or the output device 618 may comprise and/or be embodied in a single device, such as a touch-screen monitor or display.

The memory device 640 may comprise any appropriate information storage device that is or becomes known or available, including, but not limited to, units and/or combinations of magnetic storage devices (e.g., a hard disk drive), optical storage devices, and/or semiconductor memory devices, such as RAM devices, Read Only Memory (ROM) devices, Single Data Rate Random Access Memory (SDR-RAM), Double Data Rate Random Access Memory (DDR-RAM), and/or Programmable Read Only Memory (PROM). The memory device 640 may, according to some embodiments, store one or more of object detection instructions 642-1, routing instructions 642-2, loss instructions 642-3 (e.g., detection and/or classification), interface instructions 642-4, vehicle data 644-1, sensor data 644-2, contents data 644-3, tracking data 644-4, and/or insurance data 644-5. In some embodiments, the object detection instructions 642-1, routing instructions 642-2, loss instructions 642-3 (e.g., detection and/or classification), interface instructions 642-4, vehicle data 644-1, sensor data 644-2, contents data 644-3, tracking data 644-4, and/or insurance data 644-5 may be utilized by the processor 612 to provide output information via the output device 618 and/or the transceiver device 614.

According to some embodiments, the object detection instructions 642-1 may be operable to cause the processor 612 to process vehicle data 644-1, sensor data 644-2, contents data 644-3, tracking data 644-4, and/or insurance data 644-5 in accordance with embodiments as described herein. Vehicle data 644-1, sensor data 644-2, contents data 644-3, tracking data 644-4, and/or insurance data 644-5 received via the input device 616 and/or the transceiver device 618 may, for example, be analyzed, sorted, filtered, decoded, decompressed, ranked, scored, plotted, and/or otherwise processed by the processor 612 in accordance with the object detection instructions 642-1. In some embodiments, vehicle data 644-1, sensor data 644-2, contents data 644-3, tracking data 644-4, and/or insurance data 644-5 may be fed by the processor 612 through one or more mathematical and/or statistical formulas and/or models in accordance with the object detection instructions 642-1 to analyze captured data, such as captured image data descriptive of cargo and/or materials or other contents, to identify one or more objects, as described herein.

In some embodiments, the routing instructions 642-2 may be operable to cause the processor 612 to process the vehicle data 644-1, sensor data 644-2, contents data 644-3, tracking data 644-4, and/or insurance data 644-5 in accordance with embodiments as described herein. Vehicle data 644-1, sensor data 644-2, contents data 644-3, tracking data 644-4, and/or insurance data 644-5 received via the input device 616 and/or the transceiver device 618 may, for example, be analyzed, sorted, filtered, decoded, decompressed, ranked, scored, plotted, and/or otherwise processed by the processor 612 in accordance with the routing instructions 642-2. In some embodiments, vehicle data 644-1, sensor data 644-2, contents data 644-3, tracking data 644-4, and/or insurance data 644-5 may be fed by the processor 612 through one or more mathematical and/or statistical formulas and/or models in accordance with the routing instructions 642-2 to identify, calculate, and/or compute one or more cargo, vehicle, and/or driver-specific transportation routes to reduce the likelihood of loss based on historical loss data, as described herein.

According to some embodiments, the loss instructions 642-3 may be operable to cause the processor 612 to process the vehicle data 644-1, sensor data 644-2, contents data 644-3, tracking data 644-4, and/or insurance data 644-5 in accordance with embodiments as described herein. Vehicle data 644-1, sensor data 644-2, contents data 644-3, tracking data 644-4, and/or insurance data 644-5 received via the input device 616 and/or the transceiver device 618 may, for example, be analyzed, sorted, filtered, decoded, decompressed, ranked, scored, plotted, and/or otherwise processed by the processor 612 in accordance with the loss instructions 642-3. In some embodiments, vehicle data 644-1, sensor data 644-2, contents data 644-3, tracking data 644-4, and/or insurance data 644-5 may be fed by the processor 612 through one or more mathematical and/or statistical formulas and/or models in accordance with the loss instructions 642-3 to identify, detail, and/or report theft, damage, and/or other loss events utilizing AI logic, as described herein.

In some embodiments, the interface instructions 642-4 may be operable to cause the processor 612 to process the vehicle data 644-1, sensor data 644-2, contents data 644-3, tracking data 644-4, and/or insurance data 644-5 in accordance with embodiments as described herein. Vehicle data 644-1, sensor data 644-2, contents data 644-3, tracking data 644-4, and/or insurance data 644-5 received via the input device 616 and/or the transceiver device 618 may, for example, be analyzed, sorted, filtered, decoded, decompressed, ranked, scored, plotted, and/or otherwise processed by the processor 612 in accordance with the interface instructions 642-4. In some embodiments, vehicle data 644-1, sensor data 644-2, contents data 644-3, tracking data 644-4, and/or insurance data 644-5 may be fed by the processor 612 through one or more mathematical and/or statistical formulas and/or models in accordance with the interface instructions 642-4 to provide an interface (such as the interfaces 320, 520a-3 of FIG. 2, FIG. 5A, FIG. 5B, FIG. 5C, FIG. 5D, and/or FIG. 5E herein) via which input and/or output descriptive of AI theft prevention and recovery may be provided, as described herein.

According to some embodiments, the apparatus 610 may comprise the cooling device 650. According to some embodiments, the cooling device 650 may be coupled (physically, thermally, and/or electrically) to the processor 612 and/or to the memory device 640. The cooling device 650 may, for example, comprise a fan, heat sink, heat pipe, radiator, cold plate, and/or other cooling component or device or combinations thereof, configured to remove heat from portions or components of the apparatus 610.

Any or all of the exemplary instructions and data types described herein and other practicable types of data may be stored in any number, type, and/or configuration of memory devices that is or becomes known. The memory device 640 may, for example, comprise one or more data tables or files, databases, table spaces, registers, and/or other storage structures. In some embodiments, multiple databases and/or storage structures (and/or multiple memory devices 640) may be utilized to store information associated with the apparatus 610. According to some embodiments, the memory device 640 may be incorporated into and/or otherwise coupled to the apparatus 610 (e.g., as shown) or may simply be accessible to the apparatus 610 (e.g., externally located and/or situated).

Referring now to FIG. 7A, FIG. 7B, FIG. 7C, FIG. 7D, and FIG. 7E, perspective diagrams of exemplary data storage devices 740a-e according to some embodiments are shown. The data storage devices 740a-e may, for example, be utilized to store instructions and/or data, such as the object detection instructions 642-1, routing instructions 642-2, loss instructions 642-3 (e.g., detection and/or classification), interface instructions 642-4, vehicle data 644-1, sensor data 644-2, contents data 644-3, tracking data 644-4, and/or insurance data 644-5, each of which is presented in reference to FIG. 6 herein. In some embodiments, instructions stored on the data storage devices 740*a-e* may, when executed by a processor, cause the implementation of and/or facilitate the method 400 of FIG. 4 herein, and/or portions thereof.

According to some embodiments, the first data storage device 740*a* may comprise one or more various types of internal and/or external hard drives. The first data storage device 740*a* may, for example, comprise a data storage medium 746 that is read, interrogated, and/or otherwise communicatively coupled to and/or via a disk reading device 848. In some embodiments, the first data storage device 740*a* and/or the data storage medium 746 may be configured to store information utilizing one or more magnetic, inductive, and/or optical means (e.g., magnetic, inductive, and/or optical-encoding). The data storage medium 746, depicted as a first data storage medium 746*a* for example (e.g., breakout cross-section "A"), may comprise one or more of a polymer layer 746*a*-1, a magnetic data storage layer 746*a*-2, a non-magnetic layer 746*a*-3, a magnetic base layer 746*a*-4, a contact layer 746*a*-5, and/or a substrate layer 746*a*-6. According to some embodiments, a magnetic read head 748*a* may be coupled and/or disposed to read data from the magnetic data storage layer 746*a*-2.

In some embodiments, the data storage medium 746, depicted as a second data storage medium 746*b* for example (e.g., breakout cross-section "B"), may comprise a plurality of data points 746*b*-2 disposed with the second data storage medium 746*b*. The data points 746*b*-2 may, in some embodiments, be read and/or otherwise interfaced with via a laser-enabled read head 748*b* disposed and/or coupled to direct a laser beam through the second data storage medium 746*b*.

In some embodiments, the second data storage device 740*b* may comprise a CD, CD-ROM, DVD, Blu-Ray™ Disc, and/or other type of optically-encoded disk and/or other storage medium that is or becomes know or practicable. In some embodiments, the third data storage device 740*c* may comprise a USB keyfob, dongle, and/or other type of flash memory data storage device that is or becomes know or practicable. In some embodiments, the fourth data storage device 740*d* may comprise RAM of any type, quantity, and/or configuration that is or becomes practicable and/or desirable. In some embodiments, the fourth data storage device 740*d* may comprise an off-chip cache, such as a Level 2 (L2) cache memory device. According to some embodiments, the fifth data storage device 740*e* may comprise an on-chip memory device, such as a Level 1 (L1) cache memory device.

The data storage devices 740*a-e* may generally store program instructions, code, and/or modules that, when executed by a processing device cause a particular machine to function in accordance with one or more embodiments described herein. The data storage devices 740*a-e* depicted in FIG. 7A, FIG. 7B, FIG. 7C, FIG. 7D, and FIG. 7E are representative of a class and/or subset of computer-readable media that are defined herein as "computer-readable memory" (e.g., non-transitory memory devices as opposed to transmission devices or media).

Throughout the description herein and unless otherwise specified, the following terms may include and/or encompass the example meanings provided. These terms and illustrative example meanings are provided to clarify the language selected to describe embodiments both in the specification and in the appended claims, and accordingly, are not intended to be generally limiting. While not generally limiting and while not limiting for all described embodiments, in some embodiments, the terms are specifically limited to the example definitions and/or examples provided. Other terms are defined throughout the present description.

Some embodiments described herein are associated with a "user device" or a "network device". As used herein, the terms "user device" and "network device" may be used interchangeably and may generally refer to any device that can communicate via a network. Examples of user or network devices include a PC, a workstation, a server, a printer, a scanner, a facsimile machine, a copier, a Personal Digital Assistant (PDA), a storage device (e.g., a disk drive), a hub, a router, a switch, and a modem, a video game console, or a wireless phone. User and network devices may comprise one or more communication or network components. As used herein, a "user" may generally refer to any individual and/or entity that operates a user device. Users may comprise, for example, customers, consumers, product underwriters, product distributors, customer service representatives, agents, brokers, etc.

As used herein, the term "network component" may refer to a user or network device, or a component, piece, portion, or combination of user or network devices. Examples of network components may include a Static Random Access Memory (SRAM) device or module, a network processor, and a network communication path, connection, port, or cable.

In addition, some embodiments are associated with a "network" or a "communication network". As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration of type that is or becomes known. Communication networks may include, for example, one or more networks configured to operate in accordance with the Fast Ethernet LAN transmission standard 802.3-2002® published by the Institute of Electrical and Electronics Engineers (IEEE). In some embodiments, a network may include one or more wired and/or wireless networks operated in accordance with any communication standard or protocol that is or becomes known or practicable.

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like. The term "computing" as utilized herein may generally refer to any number, sequence, and/or type of electronic processing activities performed by an electronic device, such as, but not limited to looking up (e.g., accessing a lookup table or array), calculating (e.g., utilizing multiple numeric values in accordance with a mathematic formula), deriving, and/or defining.

It will be readily apparent that the various methods and algorithms described herein may be implemented by, e.g., appropriately and/or specially-programmed computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media, such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium, such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicant intends to file additional applications to pursue patents for subject matter that has been disclosed and enabled but not claimed in the present application.

It will be understood that various modifications can be made to the embodiments of the present disclosure herein without departing from the scope thereof. Therefore, the above description should not be construed as limiting the disclosure, but merely as embodiments thereof. Those skilled in the art will envision other modifications within the scope of the invention as defined by the claims appended hereto.

What is claimed is:

1. A cargo management, verification, and tracking system, comprising:
   an electronic processing device; and
   a non-transitory memory device storing (i) Artificial Intelligence (AI) analysis logic and (ii) operating instructions that when executed by the electronic processing device, result in:
   providing, by the electronic processing device and to a first remote mobile electronic device operated by a first user assigned to a particular shipment of cargo, a first cargo management, verification, and tracking interface, the first interface comprising a data input mechanism that enables the first user to input data descriptive of a plurality of items comprising the particular shipment of cargo that has been loaded on a vehicle, wherein the first user assigned to the particular shipment of cargo comprises a loader of the shipment of cargo;
   receiving, by the electronic processing device and from the first remote mobile electronic device and via the data input mechanism of the first interface, the data descriptive of the plurality of items comprising the particular shipment of cargo that has been loaded on the vehicle;
   generating, by the electronic processing device and based on the data descriptive of the plurality of items comprising the particular shipment of cargo that has been loaded on the vehicle, a cargo manifest;
   providing, by the electronic processing device and to a second remote mobile electronic device operated by a second user assigned to the particular shipment of cargo, a second cargo management, verification, and tracking interface, the second interface comprising a data output mechanism that enables the second user to receive output descriptive of a verification of the cargo manifest, wherein the second user assigned to the particular shipment of cargo comprises a transporter of the shipment of cargo;
   comparing, by an execution of the AI analysis logic by the electronic processing device, sensor data descriptive of the plurality of items comprising the particular shipment of cargo that has been loaded on the vehicle with the cargo manifest;
   outputting, by the electronic processing device and based on the comparing, and via the second interface, output descriptive of the verification of the cargo manifest;
   receiving, by the electronic processing device, from the first remote mobile electronic device and via the first interface, a request to verify an identity of the second user associated with the particular shipment of cargo, wherein the request to verify the identity comprises an image of the second user;
   authenticating, by the electronic processing device and in response to the request, and by comparing the image of the second user with a stored image of the second user, the identity of the second user associated with the particular shipment of cargo that has been loaded on the vehicle; and
   outputting, by the electronic processing device and based on the comparing, and via the first interface, and prior to the second user being permitted by the first user to depart with the particular shipment of cargo that has been loaded on the vehicle, output descriptive of the verification of the cargo manifest.

2. The cargo management, verification, and tracking system of claim 1, wherein the operating instructions, when executed by the electronic processing device, further result in:
   transmitting, by the electronic processing device and to a starter device of the vehicle, and after the authenticating, a command that authorizes movement of the vehicle.

3. The cargo management, verification, and tracking system of claim 1, wherein the authenticating, further comprises:
   initiating, by the electronic processing device, a cryptographic routine; and
   authenticating, by the electronic processing device and based on a result of the cryptographic routine, an identifier of the second user associated with the particular shipment of cargo.

4. The cargo management, verification, and tracking system of claim 3, wherein the operating instructions, when executed by the electronic processing device, further result in:

receiving, by the electronic processing device, from the first remote mobile electronic device and via the first interface, an indication of the identifier of the second user associated with the particular shipment of cargo.

5. The cargo management, verification, and tracking system of claim 1, wherein the non-transitory memory device further stores risk-based navigational routing rules, wherein the data descriptive of the plurality of items comprising the particular shipment of cargo that has been loaded on the vehicle, comprises data identifying at least one physical characteristic of the shipment of cargo, and wherein the operating instructions, when executed by the electronic processing device, further result in:

computing, by an execution of the risk-based navigational routing rules by the electronic processing device, and based at least in part on the at least one physical characteristic of the shipment of cargo, a risk-based navigational route for transporting the shipment of cargo from a first location to a second location; and transmitting, to the second remote mobile electronic device, graphical information descriptive of the risk-based navigational route.

6. A cargo management, verification, and tracking method, comprising:

providing, by an electronic processing device executing operating instructions stored on a non-transitory memory device in communication therewith, and to a first remote mobile electronic device operated by a first user assigned to a particular shipment of cargo, a first cargo management, verification, and tracking interface, the first interface comprising a data input mechanism that enables the first user to input data descriptive of a plurality of items comprising the particular shipment of cargo that has been loaded on a vehicle, wherein the first user assigned to the particular shipment of cargo comprises a loader of the shipment of cargo;

receiving, by the electronic processing device and from the first remote mobile electronic device and via the data input mechanism of the first interface, the data descriptive of the plurality of items comprising the particular shipment of cargo that has been loaded on the vehicle;

generating, by the electronic processing device and based on the data descriptive of the plurality of items comprising the particular shipment of cargo that has been loaded on the vehicle, a cargo manifest;

providing, by the electronic processing device and to a second remote mobile electronic device operated by a second user assigned to the particular shipment of cargo, a second cargo management, verification, and tracking interface, the second interface comprising a data output mechanism that enables the second user to receive output descriptive of a verification of the cargo manifest, wherein the second user assigned to the particular shipment of cargo comprises a transporter of the shipment of cargo;

comparing, by an execution of the AI analysis logic by the electronic processing device, sensor data descriptive of the plurality of items comprising the particular shipment of cargo that has been loaded on the vehicle with the cargo manifest;

outputting, by the electronic processing device and based on the comparing, and via the second interface, output descriptive of the verification of the cargo manifest;

receiving, by the electronic processing device, from the first remote mobile electronic device and via the first interface, a request to verify an identity of the second user associated with the particular shipment of cargo, wherein the request to verify the identity comprises an image of the second user;

authenticating, by the electronic processing device and in response to the request, and by comparing the image of the second user with a stored image of the second user, the identity of the second user associated with the particular shipment of cargo that has been loaded on the vehicle; and outputting, by the electronic processing device and based on the comparing, and via the first interface, and prior to the second user being permitted by the first user to depart with the particular shipment of cargo that has been loaded on the vehicle, output descriptive of the verification of the cargo manifest.

7. The cargo management, verification, and tracking method of claim 6, further comprising:

transmitting, by the electronic processing device and to a starter device of the vehicle, and after the authenticating, a command that authorizes movement of the vehicle.

8. The cargo management, verification, and tracking method of claim 6, wherein the authenticating, further comprises:

initiating, by the electronic processing device, a cryptographic routine; and authenticating, by the electronic processing device and based on a result of the cryptographic routine, an identifier of the second user associated with the particular shipment of cargo.

9. The cargo management, verification, and tracking method of claim 8, further comprising:

receiving, by the electronic processing device, from the first remote mobile electronic device and via the first interface, an indication of the identifier of the second user associated with the particular shipment of cargo.

10. The cargo management, verification, and tracking method of claim 6, wherein the non-transitory memory device further stores risk-based navigational routing rules, wherein the data descriptive of the plurality of items comprising the particular shipment of cargo that has been loaded on the vehicle, comprises data identifying at least one physical characteristic of the shipment of cargo, further comprising:

computing, by an execution of the risk-based navigational routing rules by the electronic processing device, and based at least in part on the at least one physical characteristic of the shipment of cargo, a risk-based navigational route for transporting the shipment of cargo from a first location to a second location; and transmitting, to the second remote mobile electronic device, graphical information descriptive of the risk-based navigational route.

11. The cargo management, verification, and tracking system of claim 1, wherein the operating instructions, when executed by the electronic processing device, further result in:

providing, by the electronic processing device and to the second remote mobile electronic device and after the authenticating, the cargo manifest.

12. The cargo management, verification, and tracking system of claim 1, wherein the sensor data is received from a cargo sensor and wherein the operating instructions, when executed by the electronic processing device, further result in:

provide, by the electronic processing device and to the second remote mobile electronic device and after the authenticating, information that enables the second remote mobile electronic device to communicate with the cargo sensor.

13. The cargo management, verification, and tracking system of claim 12, wherein the information that enables the second remote mobile electronic device to communicate with the cargo sensor comprises at least one of: (i) pairing data, (ii) code data, and (iii) key data.

14. The cargo management, verification, and tracking method of claim 6, further comprising:

providing, by the electronic processing device and to the second remote mobile electronic device and after the authenticating, the cargo manifest.

15. The cargo management, verification, and tracking method of claim 6, wherein the sensor data is received from a cargo sensor, further comprising:

providing, by the electronic processing device and to the second remote mobile electronic device and after the authenticating, information that enables the second remote mobile electronic device to communicate with the cargo sensor.

16. The cargo management, verification, and tracking method of claim 15, wherein the information that enables the second remote mobile electronic device to communicate with the cargo sensor comprises at least one of: (i) pairing data, (ii) code data, and (iii) key data.

* * * * *